(12) United States Patent
Okazaki

(10) Patent No.: US 9,976,050 B2
(45) Date of Patent: May 22, 2018

(54) HYDROPHILIC MATERIALS INCLUDING SULFONATE COPOLYMER AND AMINO RESIN

(71) Applicant: MITSUI CHEMICALS, INC., Tokyo (JP)

(72) Inventor: Koju Okazaki, Omuta (JP)

(73) Assignee: MITSUI CHEMICALS, INC., Tokyo (JP)

( * ) Notice: Subject to any disclaimer, the term of this patent is extended or adjusted under 35 U.S.C. 154(b) by 4 days.

(21) Appl. No.: 15/329,131

(22) PCT Filed: Jul. 28, 2015

(86) PCT No.: PCT/JP2015/071331
§ 371 (c)(1),
(2) Date: Jan. 25, 2017

(87) PCT Pub. No.: WO2016/017619
PCT Pub. Date: Feb. 4, 2016

(65) Prior Publication Data
US 2017/0210937 A1 Jul. 27, 2017

(30) Foreign Application Priority Data

Jul. 31, 2014 (JP) ................................. 2014-156146

(51) Int. Cl.
| | | |
|---|---|---|
| C09D 143/04 | (2006.01) | |
| B32B 27/06 | (2006.01) | |
| C08F 220/58 | (2006.01) | |
| C08F 230/08 | (2006.01) | |
| C08L 33/24 | (2006.01) | |
| C08L 43/04 | (2006.01) | |
| C09D 5/16 | (2006.01) | |
| C09D 5/24 | (2006.01) | |
| C09D 133/24 | (2006.01) | |
| C08L 37/00 | (2006.01) | |
| C08L 41/00 | (2006.01) | |

(52) U.S. Cl.
CPC ............ *C09D 143/04* (2013.01); *B32B 27/06* (2013.01); *C08F 220/58* (2013.01); *C08F 230/08* (2013.01); *C08L 33/24* (2013.01); *C08L 43/04* (2013.01); *C09D 5/16* (2013.01); *C09D 5/24* (2013.01); *C09D 133/24* (2013.01); *B32B 2307/728* (2013.01); *C08F 2220/585* (2013.01)

(58) Field of Classification Search
CPC .............. C08F 230/08; C09D 143/04; B32B 2307/728; C08L 43/04
USPC .......................................... 525/160; 524/512
See application file for complete search history.

(56) References Cited

U.S. PATENT DOCUMENTS

| | | | |
|---|---|---|---|
| 5,449,717 A * | 9/1995 | Yokoyama | ........... C09D 143/04 524/512 |
| 2009/0191373 A1 | 7/2009 | Okazaki et al. | |
| 2010/0243221 A1 | 9/2010 | Yamasaki et al. | |
| 2014/0256870 A1 | 9/2014 | Okazaki et al. | |
| 2016/0032036 A1 | 2/2016 | Okazaki | |
| 2016/0046827 A1 | 2/2016 | Okazaki et al. | |

FOREIGN PATENT DOCUMENTS

| | | |
|---|---|---|
| JP | S56-022365 A | 3/1981 |
| JP | S61-166824 A | 7/1986 |
| JP | H06-166847 A | 6/1994 |
| JP | H09-048945 A | 2/1997 |
| JP | H11-021512 A | 1/1999 |
| JP | 2006-089589 A | 4/2006 |
| JP | 2006-342221 A | 12/2006 |
| JP | 2009-062463 A | 3/2009 |
| JP | 2013-020103 A | 1/2013 |
| WO | WO-2007/064003 A1 | 6/2007 |
| WO | WO-2008/143143 A1 | 11/2008 |
| WO | WO-2013/054877 A1 | 4/2013 |
| WO | WO-2014/168122 A1 | 10/2014 |
| WO | WO-2014/168123 A1 | 10/2014 |

OTHER PUBLICATIONS

Korean Office Action dated Feb. 5, 2018 in corresponding application No. 10-2017-7002112.
Chida et al., Expected Materials for the Future, vol. 2, No. 1, pp. 36-41 (2002).
Hase, K., "Chapter 12: Surface-Treatment Technique," Technology and Application of Plastic Lens System, pp. 165-166 (Jun. 30, 2003).
Trend, Annual Research Report by Toagosei Co., Ltd., vol. 2, pp. 39-44 (Feb. 1999).
Tsukiyama, F., "Waterborne Architectural Stain-Resistance Paints," Kobunshi High Polymers, Japan, vol. 44, No. 5, p. 307 (May 1995).
International Search Report issued in International Patent Application No. PCT/JP2015/071331 dated Aug. 25, 2015.

\* cited by examiner

*Primary Examiner* — Fred M Teskin
(74) *Attorney, Agent, or Firm* — Foley & Lardner LLP

(57) ABSTRACT

The invention provides a cured product (for example, a film including the cured product) which has an excellent balance between hydrophilicity and abrasion resistance, can retain high hydrophilicity even when washed with water, and can remain hydrophilic and resistant to the attachment of (or can be easily cleaned of) contaminants even when subjected to long storage or heating, and a composition which can give such cured products. A cured product is obtained by curing a composition which includes a copolymer (i) including structural units represented by specific chemical formulae, and an amino resin (ii).

9 Claims, 1 Drawing Sheet

[FIG. 1]
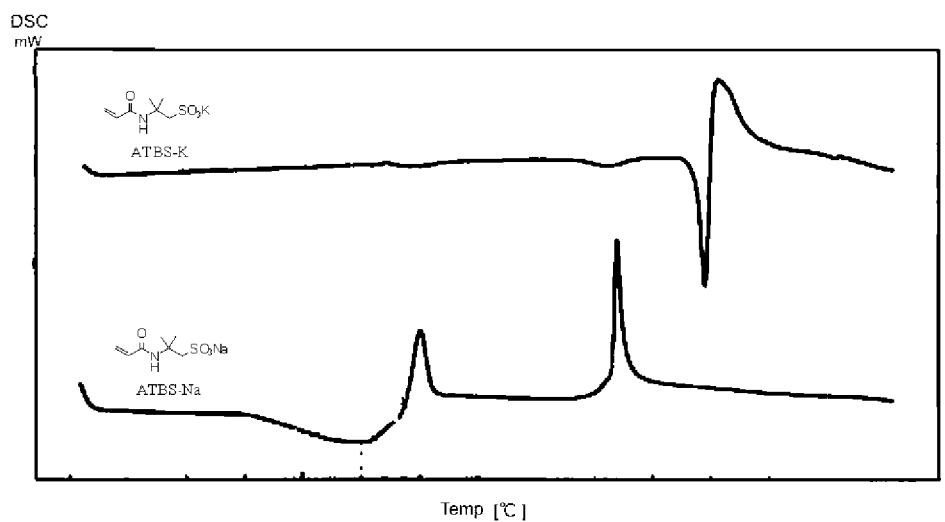
[FIG. 2]
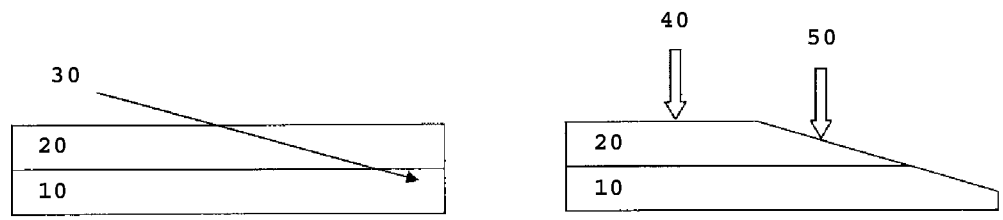

HYDROPHILIC MATERIALS INCLUDING SULFONATE COPOLYMER AND AMINO RESIN

CROSS-REFERENCE TO RELATED APPLICATIONS

The present application is a U.S. national stage application claiming the benefit of International Patent Application No. PCT/JP2015/071331, filed Jul. 28, 2015, which claims the benefit of priority to Japanese Patent Application No. 2014-156146, filed Jul. 31, 2014, the entireties of which are hereby incorporated by reference.

TECHNICAL FIELD

The present invention relates to hydrophilic cured products (for example, films including the cured products) which are antifogging, antifouling and antistatic and have excellent abrasion resistance and weather resistance, and to applications of such cured products.

BACKGROUND ART

In recent years, there has been an increasing demand that the surface of substrates such as plastic surfaces and glass surfaces be more resistant to fogging and fouling.

To solve the fogging problem, antifogging coatings have been presented which include an acrylic oligomer and a reactive surfactant. Cured products obtained from such antifogging coatings (for example, films including the cured products) are reported to have enhanced hydrophilicity and water absorption (Non Patent Document 1). To solve the fouling problem, attentions have been drawn to, for example, anti-contamination materials which exhibit self-cleaning properties (anti-contamination properties) as a result of the enhancement in surface hydrophilicity so that fouling (such as airborne hydrophobic substances) which have become attached to surfaces such as exterior walls can be detached and removed efficiently from the surfaces by rainfall, water spray or the like (Non Patent Documents 2 and 3).

To solve these "fogging" and "fouling" problems, the present inventors have presented cured products (for example, monolayer films) which have anionic hydrophilic groups enriched (concentrated) at a surface (Patent Document 1). Cured products (for example, films) obtained according to this invention are transparent and highly hydrophilic, have excellent antifogging properties, antifouling properties, antistatic properties, quick dry properties (can remove water at a high rate) and chemical resistance, and are also hard and highly resistant to scratches. However, studies by the present inventors have revealed that abrasion resistance and weather resistance are still to be improved.

In general, coating the surface of a substrate with an inorganic compound is known as a method to impart enhanced weather resistance and abrasion resistance to the substrate surface. A typical example is the sol-gel reaction of an alkoxysilane to form a hard coat on a spectacle lens (Non Patent Document 4).

Alkoxysilane hard coats have a dense structure and are therefore very hard and as resistant to abrasion as glass. On the other hand, such hard coats have drawbacks such as that they are fragile, hard to dye and fogged easily and that fouling becomes attached easily and tends to remain persistently.

Various techniques have been presented to overcome such problems. For example, dyeing properties and toughness are imparted by blending a hydroxysilane with a melamine resin and an epoxy group-containing silicon compound (Patent Document 2), by adding an epoxy compound and an aluminum complex to a hydroxysilane (Patent Document 3), or by blending a hydroxysilane with a hydroxyl group-containing acrylic polymer (Patent Document 4).

Antifogging properties are imparted by blending an alkoxysilane with a styrenesulfonic acid polymer (Patent Document 5).

Further, a water-dispersible resin composition for coating steel plates is known which is obtained by blending a copolymer resin (A) with a zirconium compound (B) and a silane coupling agent (C) wherein the copolymer resin is obtained by the emulsion polymerization of an epoxy group-containing polymerizable unsaturated monomer, a polymerizable unsaturated monomer having an acid group such as sulfonic group, a hydroxyl group-containing polymerizable unsaturated monomer, and a polymerizable unsaturated monomer having a hydrolysable silyl group each in an amount of 0.1 to 10 wt % relative to the total weight of the monomers (Patent Document 6).

Similarly, a water-dispersible resin treatment agent for metal surfaces is known which is obtained by blending a core-shell resin (A) with a zirconium compound (B) and a silane coupling agent (C) wherein the resin is obtained by the emulsion polymerization of a polymerizable unsaturated monomer having no epoxy groups, acid groups or hydroxyl groups, an epoxy group-containing polymerizable unsaturated monomer, a polymerizable unsaturated monomer having an acid group such as sulfonic group, a hydroxyl group-containing polymerizable unsaturated monomer, a polymerizable unsaturated monomer having a hydrolysable silyl group, and a polymerizable unsaturated monomer having cyclic ureido group with the specific structure each in an amount of 0.1 to 5 wt % relative to the total weight of the monomers (Patent Document 7).

Further, a method has been disclosed in which highly hydrophilic cured films are obtained by reacting a copolymer having a sulfonate group and an alkoxysilyl group, with an alkoxysilane (Patent Document 8). Furthermore, the present inventors have presented a method for obtaining highly hydrophilic cured films by reacting a copolymer having a sulfonate group and an epoxy group, with an alkoxysilane (Patent Document 9).

CITATION LIST

Patent Literature

Patent Document 1: WO 2007/064003
Patent Document 2: JP-A-S56-22365
Patent Document 3: JP-A-S61-166824
Patent Document 4: JP-A-H0G-166847
Patent Document 5: JP-A-H11-021512

Patent Document 6: JP-A-2006-342221
Patent Document 7: JP-A-2006-089589
Patent Document 8: JP-A-2009-062463
Patent Document 9: WO 2013/054877

Non Patent Literature

Non Patent Document 1: TREND, annual research report by TOAGOSEI CO., LTD., 1999, February issue, pp. 39-44
Non Patent Document 2: Koubunshi (Polymers), 44(5), p. 307, 1995
Non Patent Document 3: Mirai Zairyou (Expected Materials for the Future), 2(1), pp. 36-41, 2002
Non Patent Document 4: Plastic Lens no Gijutsu to Ouyou (Technology and applications of plastic lenses), pp. 165-166, CMC Publishing Co., Ltd., published 30 Jun. 2003

SUMMARY OF INVENTION

Technical Problem

The technique described in Patent Document 5 is an easy approach to increasing the hydrophilicity. However, the polymer is readily detached from the film and the film tends to decrease the hydrophilicity easily when washed with water (this tendency becomes marked with decreasing film thickness). Thus, the films are hardly useful in actual cases which require antifogging properties and antifouling properties (self-cleaning properties by the action of rainfall or the like).

The techniques described in Patent Documents 8 and 9 also are favorable methods that can easily increase hydrophilicity. However, studies by the present inventors have revealed that extended ambient storage or heating causes those films to be less resistant to fouling with airborne contaminants and also makes it difficult to remove such contaminants that have become attached. Objects of the invention are to provide a cured product (for example, a film including the cured product) which has an excellent balance between hydrophilicity and abrasion resistance, can retain high hydrophilicity even when washed with water, and can remain hydrophilic and resistant to the attachment of (or can be easily cleaned of) contaminants even when subjected to long storage or heating, and to provide a composition which can give such cured products.

Solution to Problem

The present inventors have determined the main cause of such facilitated attachment and difficult detachment of airborne contaminants to the use of an alkoxysilane (or a hydroxysilane) as a comonomer. The present inventors have then carried out extensive studies directed to developing a composition capable of giving cured products, for example, films including the cured products, which are free from the above problem and also attain hydrophilicity, hardness and abrasion resistance that are comparable to or higher than those obtained when an alkoxysilane (or a hydroxysilane) is used.

Specifically, the present inventors have found that a composition which includes a copolymer (i) having at least a sulfonate group and an epoxy group, a sulfonate group and an alkoxysilyl group, or a sulfonate group, an epoxy group and an alkoxysilyl group in the molecule, and an amino resin (ii) can be cured to give a cured product (for example, a film including the cured product) which has an excellent balance in hydrophilicity, hardness and abrasion resistance and is resistant to a decrease in hydrophilicity due to water, contaminants and the like.

The present invention pertains to the following [1] to [9].

[1] A cured product obtained from a composition including a copolymer (i) and an amino resin (ii), the copolymer (i) including structural units represented by the general formulae (1), (2) and (3) below:

[Chem. 1]

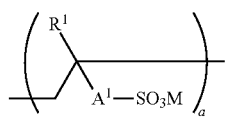

(1)

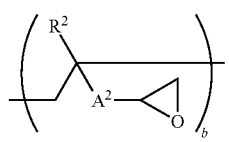

(2)

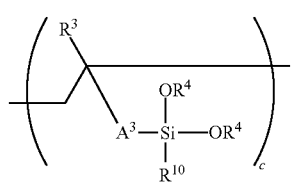

(3)

(in the formulae (1), (2) and (3), the letters a, b and c indicate the proportions of the respective structural units relative to the total number of the structural units denoted by a, b and c taken as 100 (a+b+c=100), $A^1$ denotes a single bond, a $C_{1-10}$ divalent hydrocarbon group, a group represented by the formula (1-1) below, or a group represented by the formula (1-2) below, $A^2$ denotes a single bond, a $C_{1-10}$ divalent hydrocarbon group, a group represented by the formula (2-1) below, or a group represented by the formula (2-2) below, $A^3$ denotes a single bond, a $C_{1-10}$ divalent hydrocarbon group, a group represented by the formula (3-1) below, or a group represented by the formula (3-2) below, $R^1$, $R^2$ and $R^3$ are each independently a hydrogen atom or a methyl group, $R^4$ at each occurrence is a hydrogen atom, a methyl group, an ethyl group, a propyl group or a butyl group, and $R^4$s may be the same as or different from each other, $R^{10}$ denotes a hydrogen atom, a methyl group, an ethyl group, a propyl group, a butyl group, a methoxy group, an ethoxy group, a propoxy group or a butoxy group, M denotes a hydrogen atom, an alkali metal ion, an alkaline earth metal ion having ½ atomic valence, an ammonium ion or an amine ion, and in the formulae (1-1), (1-2), (2-1), (2-2), (3-1) and (3-2), n and n2 are each independently an integer of 1 to 10, n1 is an integer of 0 to 10, m is an integer of 1 to 6, m1 is an integer of 0 to 6, l is an integer of 0 to 4, $R^5$ and $R^6$ are each independently a hydrogen atom or a methyl group, * means that the indicated end is bonded to $SO_3M$,  means that the indicated end is bonded to the epoxy group, and * means that the indicated end is bonded to the Si atom)

[Chem. 2]

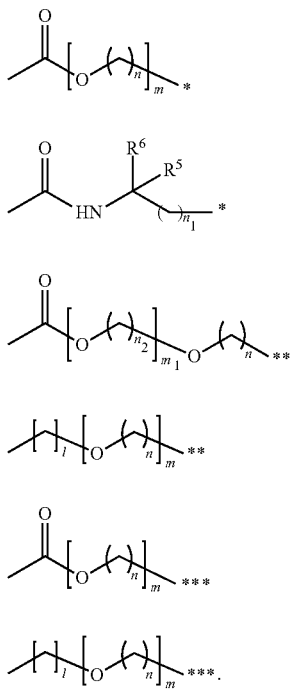

[2] The cured product described in [1], which is obtained from the composition wherein the copolymer (i) is a copolymer (i3-1) including structural units represented by the general formulae (4), (5) and (6) below:

[Chem. 3]

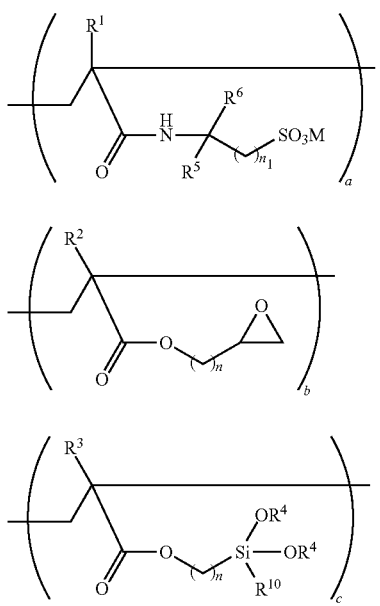

(in the formulae (4), (5) and (6), the letters a, b and c indicate the proportions of the respective structural units relative to the total number of the structural units denoted by a, b and c taken as 100 (a+b+c=100), n is an integer of 1 to 10, n1 is an integer of 0 to 10, $R^1$, $R^2$, $R^3$, $R^5$ and $R^6$ are each independently a hydrogen atom or a methyl group, $R^4$ at each occurrence is a hydrogen atom, a methyl group, an ethyl group, a propyl group or a butyl group, and $R^4$s may be the same as or different from each other, $R^{10}$ denotes a hydrogen atom, a methyl group, an ethyl group, a propyl group, a butyl group, a methoxy group, an ethoxy group, a propoxy group or a butoxy group, and M denotes a hydrogen atom, an alkali metal ion, an alkaline earth metal ion having ½ atomic valence, an ammonium ion or an amine ion).

[3] The cured product described in any of [1] to [2], which is obtained from the composition wherein the weight average molecular weight of the copolymer (i) measured by gel permeation chromatography (GPC) relative to polymethyl methacrylate standards is 500 to 3,000,000.

The cured product described in [1] or [2], which is obtained from the composition wherein the weight average molecular weight of the copolymer (i) measured by GPC is 500 to 3,000,000.

[4] The cured product described in any of [1] to [3], which is obtained from the composition wherein the amino resin (ii) is an amino resin (ii1) represented by the general formula (7) below:

[Chem. 4]

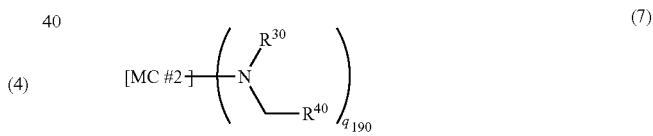

(in the formula (7), $R^{30}$ is a hydrogen atom, a $C_{1-10}$ alkyl group, a hydroxymethyl group or a $C_{1-10}$ alkoxymethyl group, $R^{40}$ is a hydroxyl group, a hydrogen atom, a $C_{1-10}$ alkyl group or a $C_{1-10}$ alkoxy group, q190 is an integer of 1 to 90, MC denotes a mother core represented by any of the general formulae (8) to (10) below, #2 denotes a hand bonded to #1 in any of the general formulae (8) to (10), and there are the same number of #2s as the number of #1s, in the formula (8), $q_{030}$ at each occurrence is an integer of 0 to 30, $q_{030}$'s may be the same as or different from one another, and $R^{30}$'s and $R^{40}$'s are the same as defined in the formula (7), in the formula (9), $q_{050}$ is an integer of 0 to 50, X at each occurrence denotes an oxygen atom or a sulfur atom, and $R^{30}$'s and $R^{40}$ are the same as defined in the formula (7), and in the formula (10), $q_{050}$ is an integer of 0 to 50)

[Chem. 5]

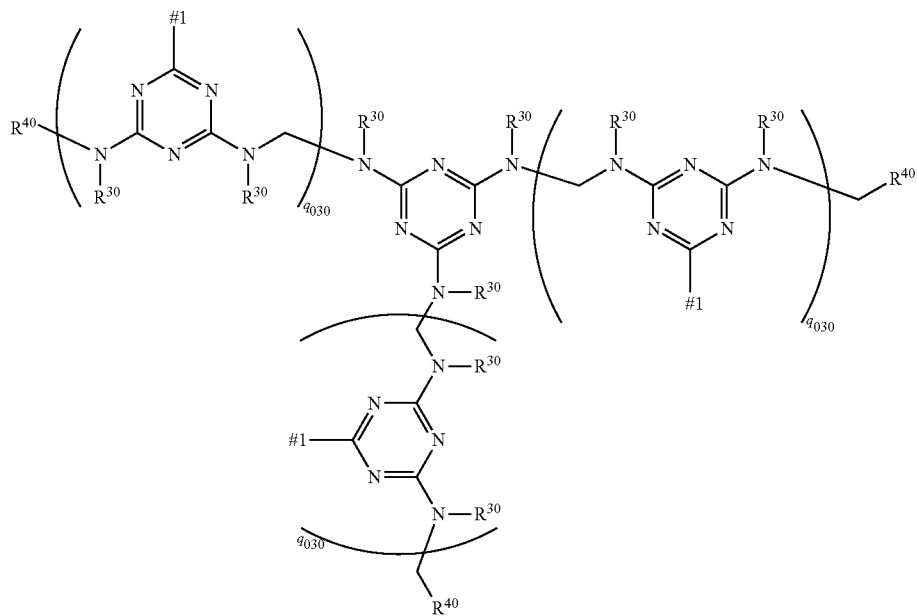
(8)

[Chem. 6]

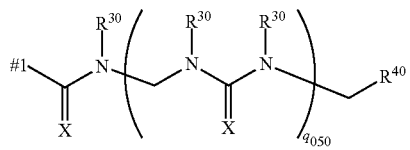
(9)

[Chem. 7]

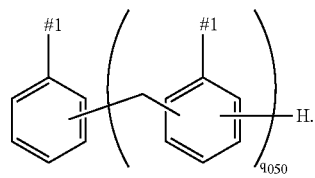
(10)

[5] The cured product described in any of [1] to [4], which is obtained from the composition wherein the weight ratio (i)/(ii) of the copolymer (i) to the amino resin (ii) is in the range of 99/1 to 1/99.

[6] The cured product described in any of [1] to [5], which is obtained from the composition further including inorganic particles (iii).

[7] The cured product described in [6], which is obtained from the composition including 5 to 98 parts by weight of the copolymer (i), 1 to 70 parts by weight of the amino resin (ii) and 1 to 90 parts by weight of the inorganic particles (iii) (wherein the total weight of the copolymer (i), the amino resin (ii) and the inorganic particles (iii) is 100 parts by weight).

[8] A film (Z1) including the cured product described in any of [1] to [7], the thickness of the film being 0.01 to 300 μm.

[9] A stack having at least one layer including the film (Z1) described in [8].

Advantageous Effects of Invention

The cured products obtained by the invention, and the films including the cured products have an excellent balance in hydrophilicity, hardness and abrasion resistance and are resistant to a decrease in hydrophilicity due to water, contaminants and the like. The films obtained by the invention may be used in the form of stacks by being stacked onto bases such as substrates.

BRIEF DESCRIPTION OF DRAWINGS

FIG. 1 is a set of DSC charts illustrating the thermal stability of compounds represented by the formula (1') in which M (counter cation) is sodium or potassium.

FIG. 2 is a schematic view illustrating how samples obtained in Examples are cut and where the sulfonate concentration is measured to determine the gradient.

DESCRIPTION OF EMBODIMENTS

A composition used to form cured products of the present invention includes a copolymer (i). The copolymer (i) includes structural units represented by the formulae (1), (2) and (3):

[Chem. 8]

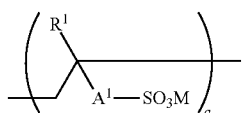
(1)

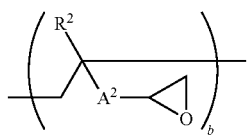
(2)

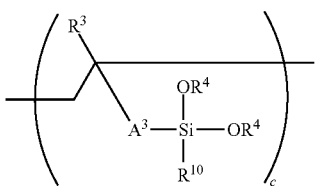

(3)

In the formulae (1), (2) and (3), the letters a, b and c indicate the proportions of the respective structural units relative to the total number of the structural units denoted by a, b and c taken as 100 (a+b+c=100).

In the formulae (1), (2) and (3), $R^1$, $R^2$ and $R^3$ are each independently a hydrogen atom or a methyl group, $R^4$ at each occurrence is a hydrogen atom, a methyl group, an ethyl group, a propyl group or a butyl group, $R^4$s may be the same as or different from each other, and $R^{10}$ denotes a hydrogen atom, a methyl group, an ethyl group, a propyl group, a butyl group, a methoxy group, an ethoxy group, a propoxy group or a butoxy group.

In the formulae (1), (2) and (3), M denotes a hydrogen atom, an alkali metal ion, an alkaline earth metal ion having ½ atomic valence, an ammonium ion or an amine ion.

In the formulae (1), (2) and (3), $A^1$ denotes a single bond, a $C_{1-10}$ divalent hydrocarbon group, a group represented by the formula (1-1) below, or a group represented by the formula (1-2) below, $A^2$ denotes a single bond, a $C_{1-10}$ divalent hydrocarbon group, a group represented by the formula (2-1) below, or a group represented by the formula (2-2) below, and $A^3$ denotes a single bond, a $C_{1-10}$ divalent hydrocarbon group, a group represented by the formula (3-1) below, or a group represented by the formula (3-2) below.

[Chem. 9]

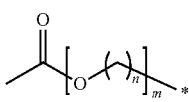

(1-1)

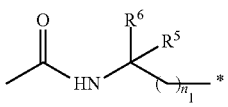

(1-2)

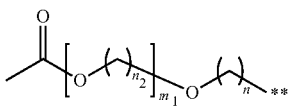

(2-1)

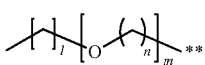

(2-2)

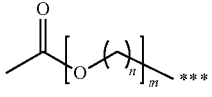

(3-1)

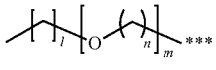

(3-2)

In the formulae (1-1), (2-1), (2-2), (3-1) and (3-2), n is an integer of 1 to 10, and m is an integer of 1 to 6. In the formula (1-2), n1 is an integer of 0 to 10. In the formula (2-1), n2 is an integer of 1 to 10, and m1 is an integer of 0 to 6. In the formulae (2-2) and (3-2), l is an integer of 0 to 4.

In the formula (1-2), $R^5$ and $R^6$ are each independently a hydrogen atom or a methyl group.

In the formulae (1-1) and (1-2), * means that the indicated end is bonded to $SO_3M$. In the formulae (2-1) and (2-2),  means that the indicated end is bonded to the epoxy group. In the formulae (3-1) and (3-2), * means that the indicated end is bonded to the Si atom.

The copolymer (i) exhibits hydrophilicity and crosslinkability by virtue of its containing the above structural units. Thus, the composition including the copolymer (i) can give cured products, for example, films including the cured products, which have an excellent balance between hydrophilicity and abrasion resistance, are resistant to a decrease in hydrophilicity due to water and also have excellent weather resistance.

Preferably, $A^1$ in the formula (1) is a single bond, methylene, phenylene, a group represented by the formula (1-1) or a group represented by the formula (1-2), and is more preferably a group represented by the formula (1-2).

When $A^1$ in the formula (1) is a group represented by the formula (1-2), the structural units represented by the formula (1) are structural units represented by the formula (4) below.

[Chem. 10]

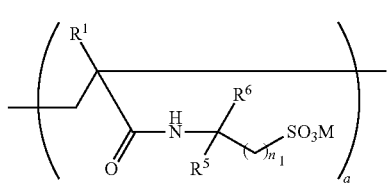

(4)

In the formula (4), a, $R^1$ and M are the same as defined in the formula (1), and $R^5$, $R^6$ and n1 are the same as defined in the formula (1-2).

In the formulae (1) and (4), M denotes a hydrogen atom, an alkali metal ion, an alkaline earth metal ion having ½ atomic valence, an ammonium ion or an amine ion. In view of the handling properties of the obtainable copolymer (i), it is preferable that $SO_3M$ be not in the form of a free acid. Thus, M is preferably an alkali metal ion, an alkaline earth metal ion having ½ atomic valence, an ammonium ion or an amine ion.

Preferred alkali metal ions are sodium ion, potassium ion and rubidium ion. Preferred alkaline earth metal ions are calcium ion and magnesium ion. Preferred ammonium ions are tetrahydroammonium ion ($NH_4^+$). Preferred amine ions are trihydro-methylamine ion, trihydro-ethylamine ion, trihydro-propylamine ion, trihydro-isopropylamine ion, trihydro-butylamine ion, trihydro-cyclohexylamine ion, trihydro-benzylamine ion, dihydro-dimethylamine ion, hydrotriethylamine ion, trihydro-ethanolamine ion, dihydro-diethanolamine ion and hydro-triethanolamine ion.

Preferably, $A^2$ in the formula (2) is a group represented by the formula (2-1) or a group represented by the formula (2-2), and is more preferably a group represented by the formula (2-1).

When $A^2$ in the formula (2) is a group represented by the formula (2-1), the structural units represented by the formula (2) are structural units represented by the formula (5A) below.

[Chem. 11]

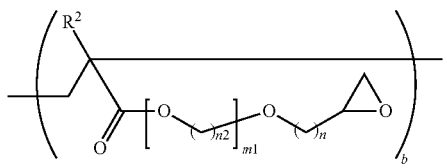

(5A)

In the formula (5A), b and $R^2$ are the same as defined in the formula (2), and n, n2 and m1 are the same as defined in the formula (2-1).

Of the structural units represented by the formula (5A), those structural units represented by the formula (5) below in which m1 is 0 are preferable.

[Chem. 12]

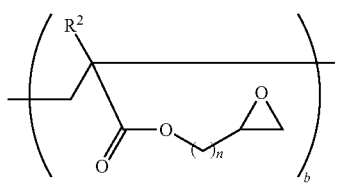

(5)

In the formula (5), b and $R^2$ are the same as defined in the formula (2), and n is the same as defined in the formula (2-1).

Preferably, $A^3$ in the formula (3) is a single bond, methylene, phenylene or a group represented by the formula (3-1), and is more preferably a group represented by the formula (3-1).

When $A^3$ in the formula (3) is a group represented by the formula (3-1), the structural units represented by the formula (3) are preferably structural units represented by the formula (6) below.

[Chem. 13]

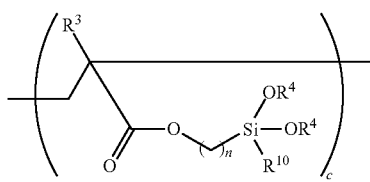

(6)

In the formula (6), c, $R^3$, $R^4$s and $R^{10}$ are the same as defined in the formula (3), and n is the same as defined in the formula (3-1).

The copolymer (i) may be a copolymer which includes structural units represented by the formulae (1), (2) and (3) (hereinafter, also written as the copolymer (i3)) and in which, provided that a+b+c=100, usually a=99.8 to 0.1, b=0.1 to 99.8 and c=0.1 to 99.8, preferably a=50 to 99.8, b=0.1 to 25 and c=0.1 to 25, and more preferably a=72 to 98, b=1 to 14 and c=1 to 14.

When the hydrophilicity of the copolymer (i) is to be increased, the objective is achieved by increasing the proportion a of the structural units having a sulfonate-containing group that are represented by the formula (1). However, excessively increasing the proportion a of the structural units of the formula (1) is not desirable at times because such an increase results in a relative decrease in the proportions of the structural units represented by the formulae (2) and (3) which have groups that contribute to the crosslinking reaction. As a result, cured products (for example, films including the cured products) that are formed from a composition including such a copolymer (i) have undesirable consequences such as low cross link density and tend to exhibit poor characteristics such as toughness, abrasion resistance and chemical resistance.

In the case where the copolymer (i) contains a high proportion of the structural units represented by (3), such characteristics as hardness and abrasion resistance tend to be enhanced but hydrophilicity tends to be decreased. Thus, applications requiring high hydrophilicity tend to prefer the copolymer (i3) as the copolymer (i).

For example, the structural units represented by the formula (1) may be introduced into the copolymer (i) by polymerizing a monomer mixture that includes a compound which has a polymerizable functional group with a carbon-carbon double bond and a $SO_3M$ group and corresponds to the structural unit represented by the formula (1). Similarly, the structural units represented by the formula (2) may be introduced into the copolymer (i) by polymerizing a monomer mixture that includes a compound which has a polymerizable functional group with a carbon-carbon double bond and an epoxy group and corresponds to the structural unit represented by the formula (2), and the structural units represented by the formula (3) may be introduced by polymerizing a monomer mixture that includes a compound which has a polymerizable functional group with a carbon-carbon double bond and an alkoxysilyl group and corresponds to the structural unit represented by the formula (3).

Thus, the proportions a, b and c of the structural units (1), (2) and (3) which may be included in the copolymer (i) may be controlled by, for example, controlling the ratio in which a monomer corresponding to the structural unit of the formula (1), a monomer corresponding to the structural unit of the formula (2) and a monomer corresponding to the structural unit of the formula (3) are contained in the monomer mixture that is polymerized to produce the copolymer (i).

Examples of the compounds which have a polymerizable functional group with a carbon-carbon double bond and a $SO_3M$ group and correspond to the structural unit represented by the formula (1) include those compounds represented by the general formula (1') below.

[Chem. 14]

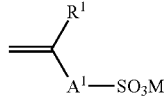

(1')

In the formula (1'), the definitions and preferred embodiments of $R^1$, $A^1$ and M are the same as those in the formula (1).

Of the compounds represented by the formula (1'), relatively preferred compounds are sulfonic compounds having a vinyl group, sulfonic compounds having an allyl group, sulfonic compounds having an isopropenyl group, sulfonic compounds having a styryl group, sulfonic compounds having an acryloyloxy group or a methacryloyloxy group (hereinafter, acryloyloxy and methacryloyloxy are sometimes collectively written as (meth)acryloyloxy, and acrylic and methacrylic are sometimes collectively written as (meth)acrylic), and sulfonic compounds having an acrylamide group or a methacrylamide group (hereinafter, acrylamide and methacrylamide are sometimes collectively written as (meth)acrylamide).

Preferred examples of the sulfonic compounds having a vinyl group include vinylsulfonic acid, and alkali metal salts and ammonium salts thereof such as lithium vinylsulfonate.

Preferred examples of the sulfonic compounds having an allyl group include allylsulfonic acid, sodium allylsulfonate and potassium allylsulfonate.

Preferred examples of the sulfonic compounds having an isopropenyl group include isopropenylsulfonic acid, sodium 4-isopropenylbenzene-1-sulfonate, sodium 3-isopropenylbenzene-1-sulfonate, sodium 2-isopropenylbenzene-1-sulfonate and potassium 4-isopropenylbenzene-1-sulfonate.

Preferred examples of the sulfonic compounds having a styryl group include 4-styrenesulfonic acid, 2-styrenesulfonic acid, and alkali metal salts, alkaline earth metal salts and ammonium salts thereof such as lithium 4-styrenesulfonate.

Preferred examples of the sulfonic compounds having a (meth)acryloyloxy group include alkali metal salts of sulfomethyl (meth)acrylate, and alkaline earth metal salts of sulfomethyl (meth)acrylate, such as sodium sulfomethyl (meth)acrylate.

Preferred examples of the sulfonic compounds having a (meth)acrylamide group include those compounds represented by the formula (4') below:

[Chem. 15]

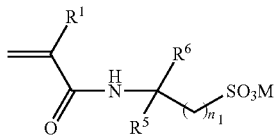

(4')

In the formula (4'), the definitions and preferred embodiments of $R^1$, $R^5$, $R^6$, M and $n1$ are the same as those in the formula (4).

Examples of the compounds represented by the formula (4') include sulfonic compounds having a (meth)acryloylamide group such as 1-(meth)acrylamido-methanesulfonic acid, potassium 1-(meth)acrylamido-methanesulfonate, 2-(meth)acrylamido-ethanesulfonic acid, sodium 2-(meth)acrylamido-ethanesulfonate, 2-(meth)acrylamido-propanesulfonic acid, potassium 2-(meth)acrylamido-propanesulfonate, 2-(meth)acrylamido-2-methyl-propanesulfonic acid ((meth)acrylamido-t-butylsulfonic acid), sodium 2-(meth)acrylamido-2-methyl-propanesulfonate salt, potassium 2-(meth)acrylamido-2-methyl-propanesulfonate salt, rubidium 2-(meth)acrylamido-2-methyl-propanesulfonate salt, calcium 2-(meth)acrylamido-2-methyl-propanesulfonate salt, magnesium 2-(meth)acrylamido-2-methyl-propanesulfonate salt, ammonium 2-(meth)acrylamido-2-methyl-propylsulfonate salt and potassium 3-(meth)acrylamido-propanesulfonate salt.

Of the compounds (1'), sulfonic compounds having a (meth)acrylamide group are preferable, and those compounds represented by the formula (4') are more preferable. Still more preferred compounds are 2-(meth)acrylamido-2-methyl-propylsulfonic acid ((meth)acrylamido-t-butylsulfonic acid), alkali metal salts of 2-(meth)acrylamido-2-methyl-propylsulfonic acid ((meth)acrylamido-t-butylsulfonic acid), alkaline earth metal salts of 2-(meth)acrylamido-2-methyl-propylsulfonic acid ((meth)acrylamido-t-butylsulfonic acid), ammonium salts of 2-(meth)acrylamido-2-methyl-propylsulfonic acid ((meth)acrylamido-t-butylsulfonic acid), and amine salts of 2-(meth)acrylamido-2-methyl-propylsulfonic acid ((meth)acrylamido-t-butylsulfonic acid). Alkali metal salts of 2-(meth)acrylamido-2-methyl-propylsulfonic acid ((meth)acrylamido-t-butylsulfonic acid) are most preferable.

Hereinbelow, there will be described reasons as to why M in the compounds represented by the general formula (1') is preferably other than a hydrogen atom and is any of an alkali metal ion, an alkaline earth metal ion having ½ valence, an ammonium ion and an amine ion.

If the sulfonic acid is not neutralized (if M is a hydrogen atom), gelation occurs at times due to the reaction between the sulfonic groups and the epoxy groups present in an epoxy group-containing compound described later (typically a compound represented by the general formula (2')) during the polymerization reaction. The reaction between the epoxy group and the sulfonic group is schematically illustrated in the following reaction equation.

[Chem. 16]

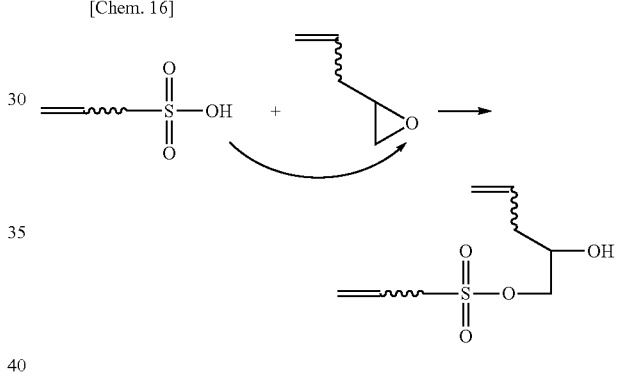

To suppress the above reaction and thereby to obtain the copolymer (i) with a high purity, it is desirable to neutralize the sulfonic groups with counter cations to suppress the reaction between the sulfonic groups and the epoxy groups. (The schematic reaction equation is similarly illustrated below.)

[Chem. 17]

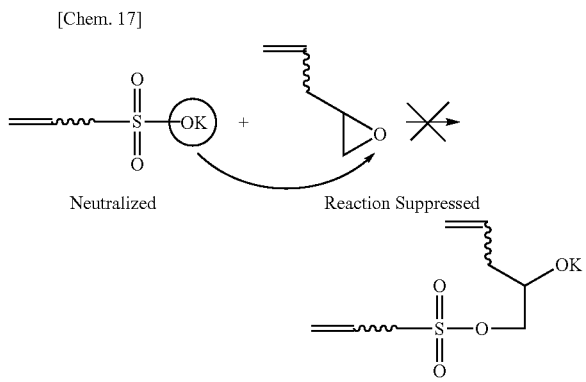

Neutralized       Reaction Suppressed

The counter cations are any of alkali metal ions, alkaline earth metal ions, ammonium ions and amine ions. Of these, alkali metal ions tend to be preferable because they tend to realize a high performance in the suppression of the reaction and also high stability. Of the alkali metals, sodium or potassium is preferable, and potassium is more preferable. Although the reasons are not clear, thermal stability is sometimes higher when the counter cation is potassium than when the counter cation is sodium. For reference, data that compare the thermal stability (DSC charts) of typical compounds having a polymerizable functional group with a carbon-carbon double bond and a sulfonate-containing group are shown in FIG. 1.

Examples of the compounds which have a polymerizable functional group with a carbon-carbon double bond and an epoxy group and correspond to the structural unit represented by the formula (2) include those compounds represented by the general formula (2') below.

[Chem. 18]

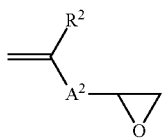

(2')

In the formula (2'), the definitions and preferred embodiments of $R^2$ and $A^2$ are the same as those in the formula (2).

Of the compounds represented by the formula (2'), relatively preferred compounds are epoxy compounds having a vinyl group, epoxy compounds having a vinyl ether group, epoxy compounds having an allyl ether group, epoxy compounds having an isopropenyl ether group, epoxy compounds having a styryl group and epoxy compounds having a (meth)acryloyloxy group.

Preferred examples of the epoxy compounds having a vinyl group include vinyl-cyclohexene monoxide, butadiene-monoxide, pentadiene-monoxide and hexadiene-monoxide.

Preferred examples of the epoxy compounds having a vinyl ether group include vinyl glycidyl ether, butanediol-divinyl ether monoxide, cyclohexanedimethanol-divinyl ether monoxide, 4-glycidyloxymethyl-1-vinyloxymethyl-cyclohexane, diethylene glycol-divinyl ether monoxide, tripropylene glycol-divinyl ether monoxide and 4-vinyloxy-1-glycidyloxy-butane.

Preferred examples of the epoxy compounds having an allyl ether group include allyl-glycidyl ether, allyl-epoxy ether, butanediol-diallyl ether monoxide, cyclohexanedimethanol-diallyl ether monoxide, 4-glycidyloxymethyl-1-allyloxymethyl-cyclohexane, diethylene glycol-diallyl ether monoxide, tripropylene glycol-diallyl ether monoxide and 4-allyloxy-1-glycidyloxy-butane.

Preferred examples of the epoxy compounds having an isopropenyl ether group include isopropenyl glycidyl ether, isopropenyl epoxy ether, butanediol-diisopropenyl ether monoxide, cyclohexanedimethanol-diisopropenyl ether monoxide, 4-glycidyloxymethyl-1-isopropenyloxymethyl-cyclohexane, diethylene glycol-diisopropenyl ether monoxide, tripropylene glycol-diisopropenyl ether monoxide, 4-isopropenyloxy-1-glycidyloxy-butane and 4-isopropenyl-1-glycidyloxy-benzene.

Preferred examples of the epoxy compounds having a styryl group include divinylbenzene-monoxide, 4-glycidyloxy-styrene, 3-glycidyloxy-styrene, 2-glycidyloxy-styrene, 4-epoxyoxy-styrene, styrylcarboxylic acid epoxy ester and styrylcarboxylic acid glycidyl ester.

Preferred examples of the epoxy compounds having a (meth)acryloyloxy group include those compounds represented by the formula (5') below:

[Chem. 19]

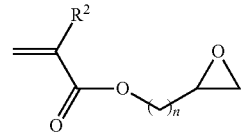

(5')

In the formula (5'), the definitions of $R^2$ and n are the same as those in the formula (5).

Examples of the compounds represented by the formula (5') include glycidyl-(meth)acrylate, epoxy-(meth)acrylate, 2-glycidyloxy-ethyl-(meth)acrylate, 3-glycidyloxy-propyl-(meth)acrylate, 4-glycidyloxy-butyl-(meth)acrylate, 6-glycidyloxy-hexyl-(meth)acrylate, 5-glycidyloxy-3-oxapentyl-(meth)acrylate, 3-glycidyloxy-2-hydroxy-propyl-(meth)acrylate, 2,3-bis(glycidyloxy)-propyl-(meth)acrylate, trimethylolpropane-diglycidyl ether-(meth)acrylate, {4-glycidyloxyphenyl}-{(4-(meth)acryloyloxy-3-hydroxy-1-oxabutyl)phenyl}-2,2-propane and 7-glycidyloxy-6,6-dimethyl-2-hydroxy-4-oxaheptyl-(meth)acrylate.

Of the compounds represented by the formula (2'), epoxy compounds having a (meth)acryloyloxy group, epoxy compounds having an allyl ether group and epoxy compounds having a styryl group are preferable, and glycidyl (meth)acrylate, 4-glycidyloxy-butyl-(meth)acrylate, allyl glycidyl ether and 4-glycidyloxystyrene are more preferable.

Examples of the compounds which have a polymerizable functional group with a carbon-carbon double bond and an alkoxysilyl and correspond to the structural unit represented by the formula (3) include those compounds represented by the general formula (3') below.

[Chem. 20]

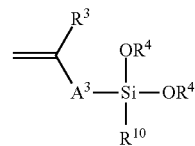

(3')

In the formula (3'), the definitions and preferred embodiments of $R^3$, $R^4$s, $R^{10}$ and $A^3$ are the same as those in the formula (3).

Of the compounds represented by the formula (3'), relatively preferred compounds are alkoxysilyl compounds having a vinyl group, alkoxysilyl compounds having a vinyl ether group, alkoxysilyl compounds having an allyl group, alkoxysilyl compounds having an isopropenyl group, alkoxysilyl compounds having an allyl ether group, alkoxysilyl compounds having an isopropenyl ether group, alkoxysilyl compounds having a styryl group and alkoxysilyl compounds having a (meth)acryloyloxy group.

Preferred examples of the alkoxysilyl compounds having a vinyl group include vinyl-trimethoxysilane, vinyl-triethoxysilane, vinyl-tripropoxysilane, vinyl-triisopropoxysilane, vinyl-tributoxysilane, vinyl-methyldimethoxysilane, vinylphenyldimethoxysilane, vinyl-ethyldiethoxysilane, vinyl-diethylmonoethoxysilane and vinyl-dimethylmonobutoxysilane.

Preferred examples of the alkoxysilyl compounds having a vinyl ether group include vinyloxy-ethyltrimethoxysilane and vinyloxy-propyltrimethoxysilane.

Preferred examples of the alkoxysilyl compounds having an allyl group include allyltrimethoxysilane, allyltriethoxysilane, allyltripropoxysilane, allyltriisopropoxysilane, allyltributoxysilane, isopropenyltriethoxysilane, allylmethyldimethoxysilane, allylphenyldimethoxysilane, allylethyldiethoxysilane, allyldiethylmonoethoxysilane and allyldimethylmonobutoxysilane.

Preferred examples of the alkoxysilyl compounds having an allyl ether group include allyloxy-ethyltrimethoxysilane, allyloxy-propyltrimethoxysilane and allyloxy-propyltriethoxysilane.

Preferred examples of the alkoxysilyl compounds having an isopropenyl group include 4-isopropenyl-1-trimethoxysilyl-benzene and 4-isopropenyl-1-triethoxysilyl-benzene.

Preferred examples of the alkoxysilyl compounds having an isopropenyl ether group include isopropenyloxy-propyltrimethoxysilane and isopropenyloxy-propyltriethoxysilane.

Preferred examples of the alkoxysilyl compounds having a styryl group include styryl-trimethoxysilane, styryl-triethoxysilane, styryl-tributoxysilane and styryl-methyldimethoxysilane.

Preferred examples of the alkoxysilyl compounds having a (meth)acryloyloxy group include those compounds represented by the formula (6') below:

[Chem. 21]

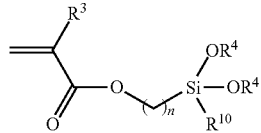

(6')

In the formula (6'), the definitions of $R^3$, $R^4$s, $R^{10}$ and n are the same as those in the formula (6).

Examples of the compounds represented by the formula (6') include (meth)acryloyloxy-ethyltrimethoxysilane, (meth)acryloyloxy-propyl-trimethoxysilane, (meth)acryloyloxy-butyl-trimethoxysilane, (meth)acryloyloxy-hexyl-trimethoxysilane, (meth)acryloyloxy-decyl-trimethoxysilane, (meth)acryloyloxy-propyl-triethoxysilane, (meth)acryloyloxy-propyl-tripropoxysilane, (meth)acryloyloxy-propyl-tributoxysilane, (meth)acryloyloxy-propyl-methyldimethoxysilane and (meth)acryloyloxy-propyl-ethyldiethoxysilane.

Of the compounds represented by the formula (3'), alkoxysilyl compounds having a vinyl group, alkoxysilyl compounds having a styryl group and alkoxysilyl compounds having a (meth)acryloyloxy group are preferable, and vinyl-trimethoxysilane, vinyl-triethoxysilane, styryl-trimethoxysilane, styryl-triethoxysilane, (meth)acryloyloxy-propyl-trimethoxysilane and (meth)acryloyloxy-propyl-triethoxysilane are more preferable.

The copolymer (i) may contain additional structural units other than the structural units represented by the general formulae (1) to (3).

For example, such additional structural units may be introduced by polymerizing a monomer mixture which includes compounds represented by the formulae (1') to (3') and compounds that will form additional structural units.

Examples of the compounds for forming additional structural units include acrylic acid, methacrylic acid, methyl (meth)acrylate, butyl (meth)acrylate, isobornyl (meth)acrylate, tetrahydrofurfuryl (meth)acrylate, phenyl (meth)acrylate, tribromophenyl (meth)acrylate, hydroxyethyl (meth)acrylate, ethyl (meth)acrylate phosphate, tetramethylpiperidyl (meth)acrylate, perfluorooctylethyl (meth)acrylate, thioglycidyl (meth)acrylate, styrene, acrylonitrile, divinylbenzene and allyl (meth)acrylate. When use is made of divinylbenzene and allyl (meth)acrylate, their amounts are desirably reduced to such an extent that the copolymer (i) will not be gelled.

The ratio (the molar ratio) of the total number of the structural units represented by the formulae (1), (2) and (3) (a+b+c), to the number of the additional structural units (d), namely, (a+b+c)/d, is usually in the range of 100/0 to 30/70, more preferably 100/0 to 50/50, and still more preferably 100/0 to 60/40. When the additional structural units (d) are used, the molar ratio (a+b+c)/d is usually in the range of 99.9/0.1 to 30/70, more preferably in the range of 99/1 to 50/50, and still more preferably in the range of 95/5 to 60/40. It is sometimes preferable that (a+b+c)/d be 70/30 or higher, or desirably 80/20 or higher.

The ratio (the mass ratio) of the total weight of the structural units represented by the formulae (1), (2) and (3) (Wa+Wb+Wc), to the weight of the additional structural units (Wd), namely, (Wa+Wb+Wc)/Wd, is preferably in the range of 100/0 to 30/70, more preferably in the range of 100/0 to 50/50, and still more preferably in the range of 100/0 to 60/40.

The copolymer (i) used in the invention is typically obtained by the solution polymerization of a monomer mixture which includes a compound represented by the formula (1'), a compound represented by the formula (2'), a compound represented by the formula (3') and optionally a compound that will form additional structural units, in the presence of a polymerization initiator. The mode of bonding in the copolymer (i) is not particularly limited, but it is preferable that the copolymer (i) be produced by radical polymerization using a radical polymerization initiator. In this case, the mode of bonding in the copolymer (i) is probably that of a random copolymer.

The number of repeating structural units and the molecular weight of the copolymer (i) used in the invention are mainly controlled by manipulating conditions such as the type of a solvent, the concentrations of the compounds (the monomers), the amount of the polymerization initiator and the reaction temperature.

The number of repeating structural units in the copolymer (i) is usually in the range of 1 to 10,000, preferably in the range of 3 to 3,000, and more preferably in the range of 30 to 1,500.

The weight average molecular weight (Mw) of the copolymer (i) measured by GPC relative to polymethyl methacrylate standards is usually in the range of 500 to 3,000,000, and from the points of view of durability and solubility is preferably 1000 to 1,000,000, and more preferably 10,000 to 500,000.

The ratio of the weight average molecular weight (Mw) to the number average molecular weight (Mn), namely, the molecular weight distribution Mw/Mn, of the copolymer (i) used in the invention is usually 1 to 10, preferably 1 to 6, and more preferably 1 to 4. This Mw/Mn ensures that the copolymer (i) or the composition including the copolymer (i) tends to exhibit excellent solubility or dispersibility with respect to a solvent, and cured products obtained by curing the composition, for example, films including the cured products, tend to attain excellent properties such as transparency and smoothness.

The polymerization initiator is preferably a radical polymerization initiator.

Examples of the radical polymerization initiators include azo compounds (azo radical polymerization initiators) and organic peroxides. Examples of the azo compounds include azobisisobutyronitrile (AIBN). Examples of the organic peroxides include ketone peroxides, diacyl peroxides (such as benzoyl peroxide), hydroperoxides, dialkyl peroxides, peroxyketals, alkyl peresters and percarbonates. Of these radical polymerization initiators, organic peroxides, in particular, alkyl peresters such as t-butyl peroxy-2-ethylhexanoate are preferable.

The amount of the polymerization initiator is approximately in the range of 0.01 to 10 wt % relative to the total weight of the compound represented by the formula (1'), the compound represented by the formula (2'), the compound represented by the formula (3') and the optional compound that will form additional structural units, and is preferably in the range of 0.1 to 5 wt %, and more preferably in the range of 0.2 to 3 wt %.

The polymerization solvent is not particularly limited as long as the solvent does not cause problems such as problems such as inhibition of polymerization reaction. Good results tend to be obtained with a highly polar solvent that exhibits high solvency for the compound represented by the formula (1'), the compound represented by the formula (2'), the compound represented by the formula (3') and the optional compound that will form additional structural units.

Examples of such polymerization solvents include alcohols such as methanol, ethanol, isopropanol (IPA), 1-propanol, 1-butanol, 1-pentanol, isopentanol, 1-hexanol, 1-octanol, cyclohexanol, benzyl alcohol, ethylene glycol, propylene glycol, ethylene glycol monomethyl ether (2-methoxyethanol) and propylene glycol monomethyl ether (1-methoxy-2-propanol), aprotic polar solvents such as acetonitrile, sulfolane, dimethylsulfoxide, N,N-dimethylformamide (DMF), N,N-dimethylacetamide (DMAc) and N,N-dimethylimidazolidinone (DMI), water, and mixtures of these solvents.

The polymerization temperature is usually set to the 10-hour half-life temperature of the radical polymerization initiator, and is approximately in the range of room temperature to 200° C., preferably in the range of 30 to 120° C., and more preferably in the range of 40 to 100° C.

Hereinbelow, desired characteristics and the higher-order structure of the copolymer (i) used in the invention will be described.

Because the copolymer (i) can be used as cured products, films and stacks for the application that high transparency is required, it is preferable that the copolymer (i) be an amorphous polymer exhibiting high transparency (an amorphous or cryptocrystalline polymer having a low crystallinity and no Tm (melting point) or a small heat of fusion).

Such a highly transparent copolymer (i) may be prepared by, for example, controlling the proportions of the structural units of the formulae (1) to (3) to fall in the desired ranges.

When, on the other hand, a higher-order structure such as a core-shell structure is formed, such core-shell particles are generally often large with a micron size. Even if the particles can be produced with a nano size, such small particles tend to gather, for example, aggregate to form large secondary particles with a micron size. For example, such micron-sized particles with a core-shell structure have a size larger than ¼ wavelength of light (about 100 nm), and thus cause light to be scattered and hence transparency to be decreased, failing to qualify to be used in high-transparency applications.

That is, the copolymer (i) used in the invention preferably does not have a higher-order structure such as a core-shell structure. In general, a core-shell structure that is formed from two kinds of materials such as polymers or polymer raw materials tends to exhibit two Tg values (glass transition points).

When no such a higher-order structure is formed, the copolymer (i) may be prepared by, for example, polymerizing the compounds (the monomers) that will form the respective structural units, in the form of a solution in a solvent (solution polymerization).

The copolymer (i) thus formed is usually large molecules having a great number of sulfonate-containing groups and frequently exhibits solubility only with respect to water. Thus, in the above case, the copolymer is precipitated out of the polymerization solution with the progress of the polymerization reaction as long as a large amount of water is not used as the polymerization solvent.

By virtue of such characteristics, the target copolymer can be obtained simply by performing filtration and drying after the completion of the polymerization reaction.

In the case where the copolymer has a small number of sulfonate-containing groups and is hardly precipitated out of the polymerization solution, the target copolymer can be obtained by adding the solution into a poor solvent to cause the precipitation, or by evaporating the solvent with a device such as an evaporator, admixing a poor solvent with the residue, filtering the mixture and drying the filtered residue.

The copolymer (i) in the invention is cured into a cured product according to the invention mainly by the crosslinking reaction with an amino resin (ii) described later. Because the copolymer (i) contains at least one type of groups selected from epoxy groups and alkoxysilyl groups, the molecules of the copolymer (i) are also crosslinked with one another to possibly form a part of the skeleton of the inventive cured product. The reaction of the epoxy groups and the alkoxysilyl groups is usually accelerated by heating. Examples of the methods for accelerating the reaction other than by heating include the irradiation of microwaves that are a type of radiations.

The reactions that occur on the respective groups will be described in detail hereinbelow with reference to a copolymer having a typical combination of (a), (b) and (c).

[Chem. 22]

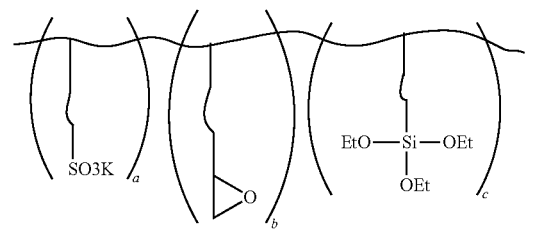

(10')

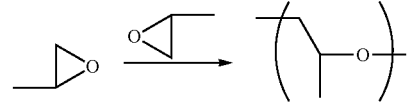

(11)

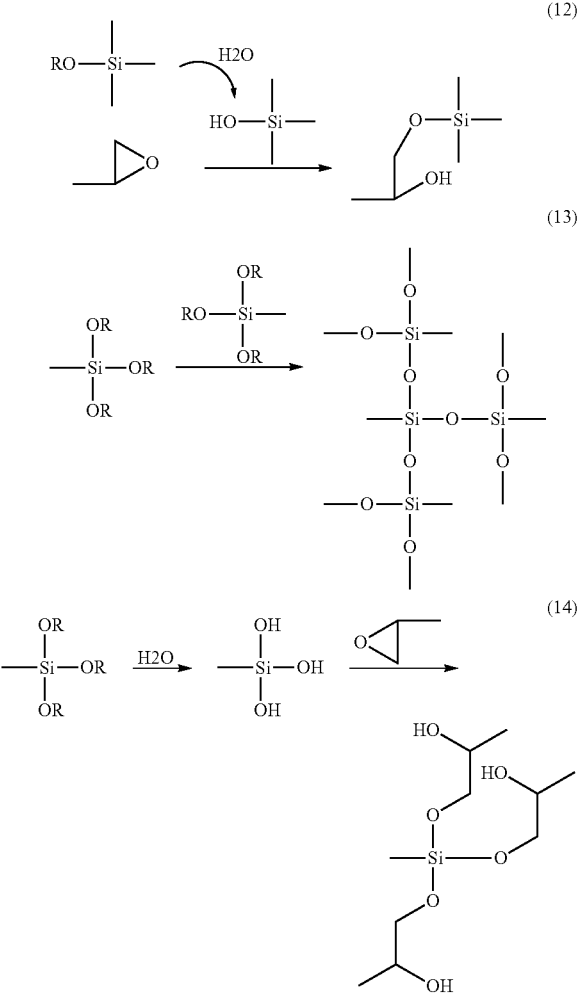

(Reaction Between Epoxy Groups)

The reaction occurring between epoxy groups is illustrated in the general formula (11). This reaction is preferably carried out while performing heating. The heating temperature is approximately in the range of 30 to 250° C., preferably in the range of 30 to 200° C., and more preferably in the range of 30 to 150° C. The reaction between epoxy groups tends to be accelerated by the presence of a catalyst represented by a cation such as an acid or an anion such as a base.

(Reaction Between Epoxy Group and Alkoxysilyl Group)

The reactions occurring between an epoxy group and an alkoxysilyl group are illustrated in the general formula (12) and the general formula (14).

In general, an epoxy group and an alkoxysilyl group are less reactive with each other directly, and the reaction usually takes place between an epoxy group and a silanol group resulting from the hydrolysis of an alkoxysilyl group. The reaction between an epoxy group and an alkoxysilyl group is preferably carried out while performing heating. The heating temperature is approximately in the range of 30 to 300° C., preferably in the range of 50 to 250° C., and more preferably in the range of 100 to 200° C.

The hydrolysis reaction of an alkoxysilyl group, and the reaction between an epoxy group and a silanol group tend to be accelerated by the presence of a catalyst represented by a cation such as an acid or an anion such as a base. This catalyzed reaction is preferably performed while performing heating. The heating temperature is approximately in the range of 30 to 250° C., preferably in the range of 30 to 200° C., and more preferably in the range of 30 to 180° C.

(Reaction Between Alkoxysilyl Groups)

The reaction occurring between alkoxysilyl groups is illustrated in the general formula (13). This reaction is preferably carried out while performing heating. The heating temperature is approximately in the range of 30 to 250° C., preferably in the range of 30 to 200° C., and more preferably in the range of 30 to 180° C.

An alkoxysilyl group is hydrolyzed relatively easily with water into a silanol group. This silanol group is highly reactive, and the reaction between silanol groups occurs more readily than the reaction between alkoxysilyl groups. Thus, the reaction between alkoxysilyl groups usually takes place between silanol groups formed by hydrolysis with water, and also between a silanol group and an alkoxysilyl group. The reaction between silanol groups, and the reaction between a silanol group and an alkoxysilyl group are preferably performed while performing heating. The heating temperature is approximately in the range of 30 to 200° C., preferably in the range of 30 to 180° C., and more preferably in the range of 30 to 150° C.

The reaction between alkoxysilyl groups, the hydrolysis reaction of an alkoxysilyl group, the reaction between an alkoxysilyl group and a silanol group, and the reaction between silanol groups tend to be accelerated by the presence of a catalyst represented by a cation such as an acid, an anion such as a base, or a metal compound such as alkoxytitanium or tin oxide.

A cured product (for example, a film) of the invention may be obtained by curing the composition including the copolymer (i) and an amino resin (ii).

Typically, a copolymer having a sulfonate group, an epoxy group and an alkoxysilyl group in the molecule (the general formula (10') hereinabove) and a melamine resin that is a typical amino resin (the general formula (15) below) may be reacted with each other (for example, are crosslinked by the condensation polymerization reaction at hydroxymethyl groups or alkoxymethyl groups illustrated in the general formulae (16) to (19) below) to form a cured product, for example, a film. The condensation polymerization reaction with hydroxymethyl groups or alkoxymethyl groups usually proceeds under heated conditions. Examples of the curing methods other than by heating include the irradiation of microwaves that are a type of radiations.

The reactions that occur on the respective groups will be described in detail hereinbelow with reference to examples.

[Chem. 23]

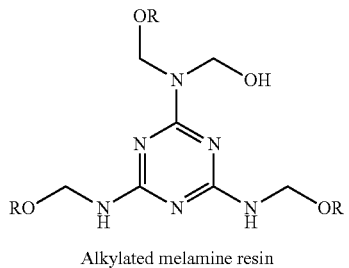

Alkylated melamine resin (15)

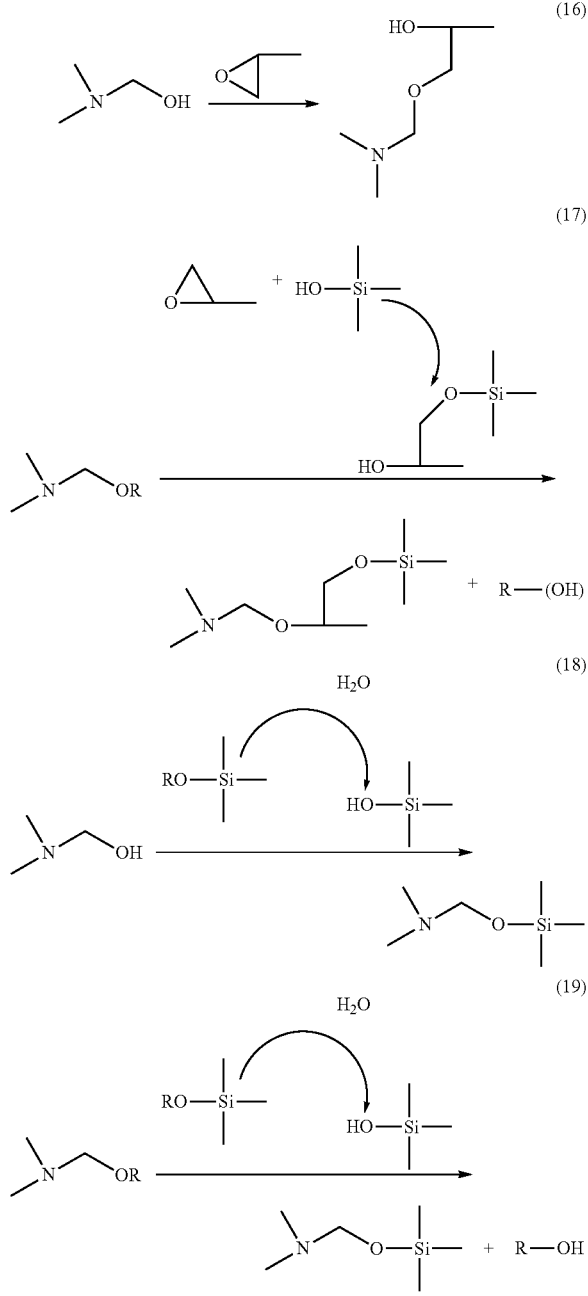

(Reaction Between Hydroxymethyl Group and Epoxy Group)

The reaction between a hydroxymethyl group and an epoxy group is illustrated in the general formula (16). This reaction is slow and tends to be accelerated by the addition of a compound such as an Arrhenius acid or a Lewis acid as a catalyst. The reaction temperature is approximately in the range of 30 to 300° C., preferably in the range of 50 to 250° C., and more preferably in the range of 80 to 180° C.

(Reaction Between Alkoxymethyl Group and Epoxy Group)

The reaction between an alkoxymethyl group and an epoxy group is illustrated in the general formula (17). Because the progress of this reaction tends to be more difficult than the above reaction (16) between a hydroxymethyl group and an epoxy group, the epoxy group usually undergoes ring-opening reaction with an active hydrogen group such as silanol group to form a secondary hydroxyl group, which then undergoes condensation reaction. Similarly to the reaction illustrated in the general formula (16), this reaction between an alkoxymethyl group and a secondary hydroxyl group is slow and tends to be accelerated by the addition of a compound such as an Arrhenius acid or a Lewis acid as a catalyst. The reaction temperature is approximately in the range of 30 to 300° C., preferably in the range of 50 to 250° C., and more preferably in the range of 80 to 180° C.

(Reaction Between Hydroxymethyl Group and Silanol Group)

The general formula (18) an illustrates the reaction between a hydroxymethyl group and a silanol group resulting from the hydrolysis of an alkoxysilyl group derived from the copolymer (i). This reaction tends to be faster than the reaction with a secondary alcohol illustrated in the general formula (18). To increase the reaction rate, a compound such as an Arrhenius acid or a Lewis acid is sometimes added as a catalyst. The reaction temperature is approximately in the range of 20 to 300° C., preferably in the range of 40 to 250° C., and more preferably in the range of 80 to 180° C.

(Reaction Between Alkoxymethyl Group and Silanol Group)

The general formula (19) illustrates the reaction between an alkoxymethyl group and a silanol group resulting from the hydrolysis of an alkoxysilyl group derived from the copolymer (i). Similarly to the reaction illustrated in the general formula (18), this reaction tends to be faster than the reaction with a secondary alcohol illustrated in the general formula (17). To increase the reaction rate, a compound such as an Arrhenius acid or a Lewis acid is sometimes added as a catalyst. The reaction temperature is approximately in the range of 20 to 300° C., preferably in the range of 40 to 250° C., and more preferably in the range of 80 to 180° C.

The amino resin (ii) used in the invention is a resin formed by the polycondensation of an amino group-containing compound and formaldehyde. Examples include melamine resins formed by the polycondensation with melamine, urea (urea) resins formed by the polycondensation with urea, and aniline resins formed by the polycondensation with aniline. These amino resins may be alkylated amino resins substituted with alkoxy groups in place of part or all of the hydroxyl groups formed by the reaction of formaldehyde.

Of the amino resins (ii), those amino resins (ii1) represented by the general formula (7) are preferable.

[Chem. 24]

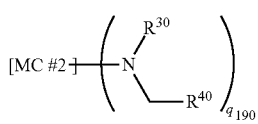

(7)

In the formula (7), $R^{30}$ is a hydrogen atom, a $C_{1-10}$ alkyl group, a hydroxymethyl group or a $C_{1-10}$ alkoxymethyl group, $R^{40}$ is a hydroxyl group, a hydrogen atom, a $C_{1-10}$ alkyl group or a $C_{1-10}$ alkoxy group, q190 is an integer of 1 to 90, MC denotes a mother core represented by any of the general formulae (8) to (10) below, #2 denotes a hand bonded to #1 in any of the general formulae (8) to (10), and there are the same number of #2s as the number of #1s.

In the formula (8) below, $q_{o30}$ at each occurrence is an integer of 0 to 30, $q_{o30}$'s may be the same as or different from one another, and $R^{30}$'s and $R^{40}$'s are the same as defined in the formula (7).

In the formula (9) below, $q_{o50}$ is an integer of 0 to 50, X at each occurrence denotes an oxygen atom or a sulfur atom, and $R^{30}$'s and $R^{40}$ are the same as defined in the formula (7).

In the formula (10) below, $q_{o50}$ is an integer of 0 to 50.

In the formula (8), $R^{30}$'s are preferably alkoxymethyl groups or methylol groups, $R^{40}$'s are preferably $C_{1-10}$ alkoxy groups, and $q_{o30}$ at each occurrence is preferably an integer of 0 to 10. In the formula (9), $R^{30}$'s are preferably alkoxymethyl groups or methylol groups, $R^{40}$ is preferably a $C_{1-10}$ alkoxy group, and $q_{o50}$ is preferably an integer of 1 to 10. In the formula (10), $q_{o50}$ is preferably an integer of 1 to 10.

Examples of the aniline resins include hydrogenated aniline resins, methylated aniline resins, ethylated aniline resins, n-propylated aniline resins, isopropylated aniline resins, n-butylated aniline resins, isobutylated aniline resins, n-hexylated aniline resins, n-octylated aniline resins, n-decylated aniline resins and n-dodecylated aniline resins.

In the composition used in the invention, the weight ratio of the copolymer (i) to the amino resin (ii), (i)/(ii), is approximately in the range of 99/1 to 1/99, preferably in the range of 95/5 to 5/95, and more preferably in the range of 90/10 to 10/90.

The composition that gives cured products of the invention (for example, films including the cured products) may contain additional components other than the copolymer (i)

[Chem. 25]

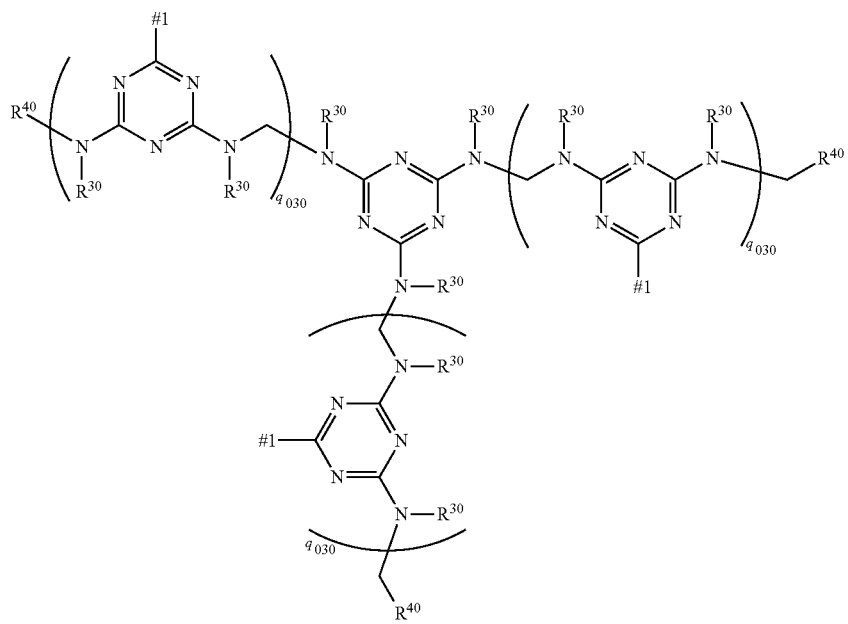

(8)

[Chem. 26]

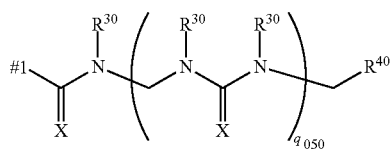

(9)

[Chem. 27]

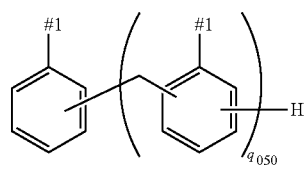

(10)

Examples of the melamine resins include hydrogenated melamine resins, methylated melamine resins, ethylated melamine resins, n-propylated melamine resins, isopropylated melamine resins, n-butylated melamine resins, isobutylated melamine resins, n-hexylated melamine resins, n-octylated melamine resins, n-decylated melamine resins and n-dodecylated melamine resins.

Typical examples of the urea (urea) resins include hydrogenated urea (urea) resins, methylated urea (urea) resins, ethylated urea (urea) resins, n-propylated urea (urea) resins, isopropylated urea (urea) resins, n-butylated urea (urea) resins, isobutylated urea (urea) resins, n-hexylated urea (urea) resins, n-octylated urea (urea) resins, n-decylated urea (urea) resins and n-dodecylated urea (urea) resins.

and the amino resin (ii) while still achieving the advantageous effects of the invention.

For the purposes of, for example, increasing the hardness of cured products obtained according to the invention and increasing the concentration (the gradient) of sulfonate groups as hydrophilic groups on a surface of the cured products, the composition may contain inorganic particles (iii). Examples of the inorganic particles (iii) include silver particles, copper particles, copper oxide particles, silica particles, hollow silica particles, alumina particles, iron oxide particles, cobalt oxide particles, zirconia dioxide particles, titanium dioxide particles and antimony oxide particles. In particular, silica particles, hollow silica particles, zirconia dioxide particles and titanium dioxide particles are preferable, and silica particles, zirconia dioxide particles and titanium dioxide particles are more preferable. The surface of these inorganic particles may be modified with, for example, organic groups having an alkyl group or a (meth) acryloyl group in order to attain enhanced dispersibility. Further, to ensure transparency, inorganic particles (iii) having a nanometer diameter tend to be preferable. Those inorganic particles which are mentioned above and whose particle diameters are nanometer sizes, that is, inorganic nano particles (such as silica nano particles, zirconium dioxide nano particles and titanium dioxide nano particles) tend to be more preferable.

When the composition includes the inorganic particles (iii) in addition to the copolymer (i) and the amino resin (ii), the composition preferably contains 5 to 98 parts by weight of the copolymer (i), 1 to 70 parts by weight of the amino resin (ii) and 1 to 90 parts by weight of the inorganic particles (iii), more preferably 10 to 70 parts by weight of the copolymer (i), 5 to 40 parts by weight of the amino resin (ii) and 25 to 75 parts by weight of the inorganic particles (iii), and still more preferably 20 to 60 parts by weight of the copolymer (i), 10 to 30 parts by weight of the amino resin (ii) and 30 to 70 parts by weight of the inorganic particles (iii) with respect to the total weight of the copolymer (i), the amino resin (ii) and the inorganic particles (iii) taken as 100 parts by weight.

Further, the composition may contain reactive compounds such as compounds having an epoxy group other than the copolymer (i), compounds having a hydroxyl group, compounds having a mercapto group, compounds having a carboxyl group, compounds having an amino group, and acid anhydrides.

Some examples of the reactions which can occur between these reactive compounds and the epoxy groups present in the copolymer (i) are illustrated in the general formula (20) below. Further, some examples of the reactions which can occur between these reactive compounds and the alkoxysilyl groups present in the copolymer (i) are illustrated in the general formula (21) below.

[Chem. 28]

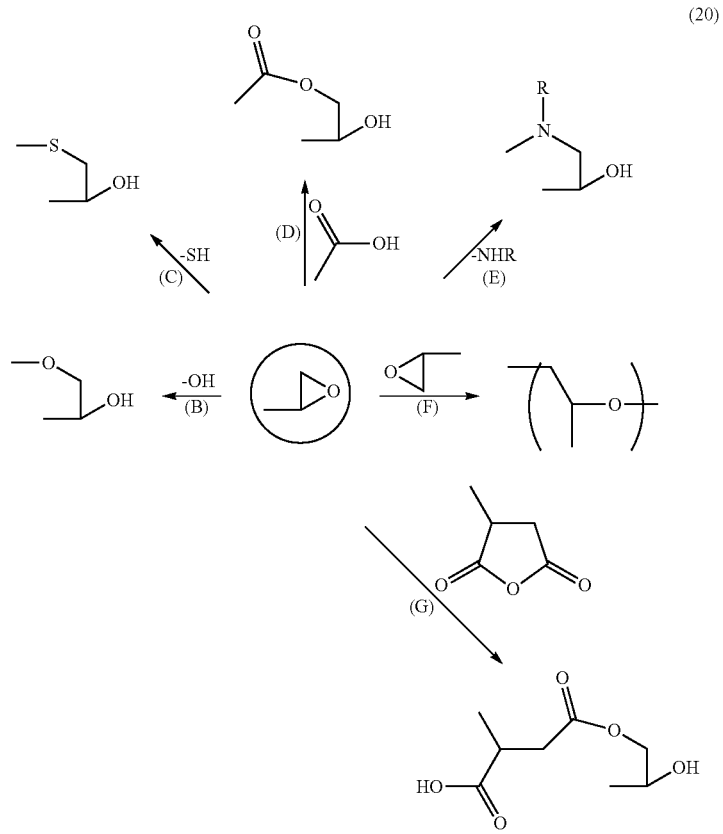

(20)

[Chem. 29]

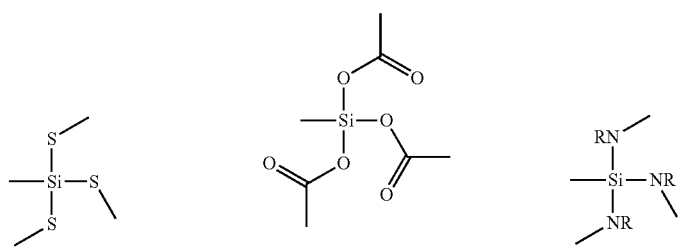

(21)

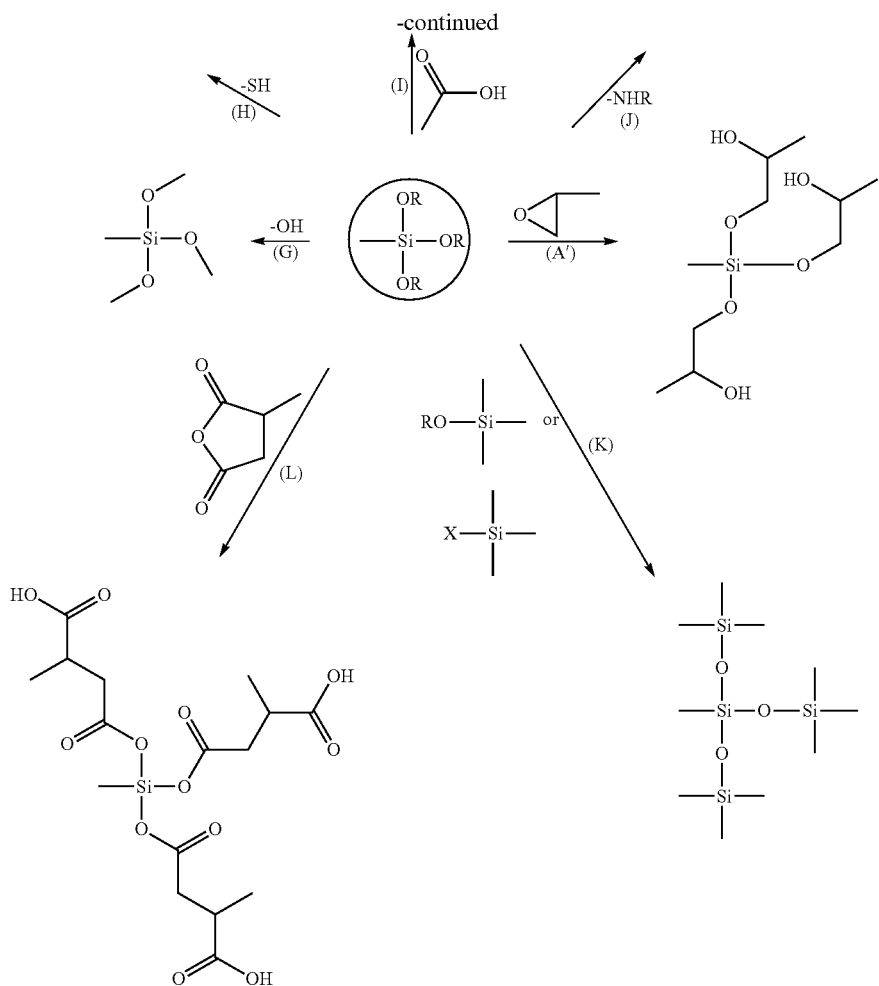

When an epoxy group-containing compound other than the copolymer (i) is used as the reactive compound, the main reaction among the reactions illustrated in the formula (20) (the reactions with an epoxy group in the copolymer (i)) is one that occurs through the reaction route (F), and the main reaction among the reactions illustrated in the formula (21) (the reactions with an alkoxysilyl group in the copolymer (i)) is one that occurs through the reaction route (A'), resulting in curing.

Preferred epoxy group-containing compounds other than the copolymers (i) are polyepoxy compounds having two or more epoxy groups in the molecule. Examples of the polyepoxy compounds include bisphenol A bis(glycidyl ether), bisphenol F bis(glycidyl ether), hydrogenated bisphenol A bis(glycidyl ether), N,N',N'''-trisglycidyl-isocyanurate, isocyanurate polyglycidyl ether (TEPIC-PAS B22 and TEPIC-PAS B26 from NISSAN CHEMICAL INDUSTRIES, LTD.), phenol novolac polyglycidyl ether (N-730 from DIC Corporation, and 152 from Mitsubishi Chemical Corporation), 1.1.2.2.-tetrakis(4-glycidyloxy-phenyl)ethane, N,N,N',N'-tetraglycidyl-diaminodiphenylmethane, trimethylolpropane-triglycidyl ether, neopentyl glycol diglycidyl ether, butanediol diglycidyl ether, polyethylene glycol diglycidyl ether (YDE205 from Mitsubishi Chemical Corporation), diglycidyl cyclohexanedicarboxylate ester, diglycidyl phthalate ester, 3,4-epoxycyclohexylmethyl-3',4'-epoxycyclohexane carboxylate, and dicyclodecane polyglycidyl ether (EPICLON HP-7200L and EPICLON HP-7200H from DIC Corporation).

When a hydroxyl group-containing compound is used as the reactive compound, the main reaction among the reactions illustrated in the formula (20) (the reactions with an epoxy group in the copolymer (i)) is one that occurs through the reaction route (B), and the main reaction among the reactions illustrated in the formula (21) (the reactions with an alkoxysilyl group in the copolymer (i)) is one that occurs through the reaction route (G), resulting in curing.

Preferred hydroxyl group-containing compounds are polyhydric compounds having two or more hydroxyl groups. Examples of the polyhydric compounds include ethylene glycol, diethylene glycol, 1,2-propylene glycol, glycerin, trimethylolpropane, pentaerythritol, dipentaerythritol, xylylenediol, resorcinol, bisphenol A, phenol formaldehyde resin (Mitsui Chemicals, Inc.), melamine-formaldehyde condensation product, melamine-formaldehyde-lower alcohol condensation product, urea-formaldehyde condensation product and urea-formaldehyde-lower alcohol condensation product. Examples of the hydroxyl group-containing compounds further include melamine-lower alcohol condensation product and urea-lower alcohol condensation product. These compounds are easily hydrolyzed with water to form hydroxyl groups, and thus may be used as the hydroxyl group-containing compounds in the invention.

When a mercapto group-containing compound is used as the reactive compound, the main reaction among the reactions illustrated in the formula (20) (the reactions with an epoxy group in the copolymer (i)) is one that occurs through the reaction route (C), and the main reaction among the reactions illustrated in the formula (21) (the reactions with an alkoxysilyl group in the copolymer (i)) is one that occurs through the reaction route (H), resulting in curing.

Preferred mercapto group-containing compounds are polymercapto compounds having two or more mercapto groups. Examples of the polymercapto compounds include glyceryl dithioglycolate. Examples of the polymercapto compounds further include those polymercapto compounds described in paragraph [0120] of WO 2014/168122.

When a carboxyl group-containing compound is used as the reactive compound, the main reaction among the reactions illustrated in the formula (20) (the reactions with an epoxy group in the copolymer (i)) is one that occurs through the reaction route (D), and the main reaction among the reactions illustrated in the formula (21) (the reactions with an alkoxysilyl group in the copolymer (i)) is one that occurs through the reaction route (I), resulting in curing.

Preferred carboxyl group-containing compounds are polycarboxyl compounds having two or more carboxyl groups. Examples of the polycarboxyl compounds include maleic acid. Examples of the polycarboxyl compounds further include those polycarboxyl compounds described in paragraph [0122] of WO 2014/168122.

When an amino group-containing compound is used as the reactive compound, the main reaction among the reactions illustrated in the formula (20) (the reactions with an epoxy group in the copolymer (i)) is one that occurs through the reaction route (E), and the main reaction among the reactions illustrated in the formula (21) (the reactions with an alkoxysilyl group in the copolymer ROM (i)) is one that occurs through the reaction route (I), resulting in curing.

Preferred amino group-containing compounds are polyamino compounds having two or more amino groups. Examples of the polyamino compounds include phenylenediamine. Examples of the polyamino compounds further include those polyamino compounds described in paragraph [0124] of WO 2014/168122.

When an acid anhydride is used as the reactive compound, the main reaction among the reactions illustrated in the formula (20) (the reactions with an epoxy group in the copolymer (i)) is one that occurs through the reaction route (G), and the main reaction among the reactions illustrated in the formula (21) (the reactions with an alkoxysilyl group in the copolymer (i)) is one that occurs through the reaction route (L), resulting in curing.

Examples of the acid anhydrides include maleic anhydride and succinic anhydride. Examples of the acid anhydrides further include those acid anhydrides described in paragraph [0126] of WO 2014/168122.

For purposes such as to increase the rate of curing of the inventive composition, catalysts such as acid catalysts and base catalysts may be used.

Examples of the acid catalysts include hydrochloric acid and sulfuric acid. Examples of the acid catalysts further include those acid catalysts described in paragraph [0139] of WO 2014/168122. Examples of the base catalysts include those base catalysts described in the same paragraph.

The amount of the acid catalyst or the base catalyst is preferably in the range of 0.1 to 20 wt %, more preferably in the range of 0.2 to 10 wt %, and still more preferably in the range of 0.3 to 5 wt % relative to the total of the copolymer (i) and the amino resin (ii).

Other components such as additives and modifiers may be added to the composition in order to improve the properties of cured products of the invention (typically, films including the cured products) obtained by curing the composition including the copolymer (i) and the amino resin (ii). Examples of the additives and modifiers include UV absorbers, HALS (hindered amine light stabilizers), antioxidants, radical scavengers, fillers other than inorganic particles, pigments, color correction agents, refractive index enhancers, fragrances, surfactants, anti-foaming agents, leveling agents, anti-sag agents and other modifiers.

The UV absorbers and HALS are mainly added for purposes such as to further enhance weather resistance. The antioxidants and radical scavengers are mainly added for purposes such as to enhance heat resistance and to prevent degradations. The fillers are mainly added for purposes such as to enhance abrasion resistance and to impart toughness. Examples of the fillers other than inorganic particles include those fillers described in paragraph [0180] of WO 2014/168122. Additives such as pigments, dyes, color correction agents, refractive index enhancers and fragrances may be used for purposes such as those described in the same paragraph, and examples of such additives include those mentioned therein.

In order to form an inventive cured product with a gradient of the sulfonate concentration (typically, a film including the cured product, gradient $Sa/Da \geq 1.1$) which has suitable applications, the addition of a surfactant is as effective as the selective use of a polar solvent.

Preferred examples of the surfactants include those surfactants described in paragraph [0181] of WO 2014/168122.

Of the surfactants, sodium lauryl sulfate, sodium distearyl sulfosuccinate, sodium dialkyl sulfosuccinate (PELEX TR and PELEX OT-P from Kao Corporation), sorbitan stearate and laurylbetaine tend to be preferable.

The anti-foaming agents, leveling agents and anti-sag agents are mainly added for purposes such as to improve application properties, to impart smoothness to surfaces, and to enhance the appearance of cured products (for example, films including the cured products).

Examples of the anti-foaming agents include those antifoaming agents described in paragraph [0182] of WO 2014/168122.

Examples of the leveling agents include those leveling agents described in paragraph [0183] of WO 2014/168122.

Examples of the anti-sag agents include those anti-sag agents described in paragraph [0184] of WO 2014/168122.

Examples of the other modifiers include polyacrylate and polymethacrylate.

The composition that gives cured products according to the invention may contain other components such as hydrolysable silicon compounds other than the copolymers (i) and hydrolysates thereof, for example, alkoxysilanes, halogenated silanes and hydroxysilanes. The incorporation of such a hydrolyzable silicon compound and hydrolysate thereof into the composition tends to result in a cured product (for example, a film including the cured product) that adsorbs airborne contaminants easily and is hardly cleaned of such contaminants. It is therefore desirable at times that such a hydrolyzable silicon compound and hydrolysate thereof be not added positively when hydrophilicity should be maintained over a long period of time.

In a cured product (typically, a film including the cured product) obtained by curing the composition, the sulfonate-containing groups derived from the copolymer (i) sometimes have a concentration that gradually increases (becomes enriched) from the inside of the cured product toward the outer surface of the cured product. It is probable that the surface of the cured product exhibits a level of hydrophilicity in accordance with the degree of this gradient.

The main principles that give rise to such a graded structure are that "a polar solvent that has been added beforehand carries the hydrophilic copolymer (i) having sulfonate-containing groups during the evaporation of the polar solvent so that the composition can be cured while the hydrophilic moieties are concentrated at the surface" and that "a surfactant that has been added carries the copolymer during its movement to the surface so that the composition can be cured while the hydrophilic moieties are concentrated at the surface".

When a cured layer (for example, a film) of the composition is formed on a substrate, the gradient of the inventive copolymer (i) having sulfonate-containing groups is represented by the ratio of the sulfonate concentrations (Sa/Da) wherein Sa is the sulfonate concentration at the outer surface opposite to the substrate, and Da is the sulfonate concentration at the middle point between the interface in contact with the substrate and the outer surface. Specifically, a large ratio of the sulfonate concentrations (Sa/Da) indicates that a large quantity of the sulfonate groups are concentrated at the outer surface of the cured layer. That is, a larger ratio of the sulfonate concentrations (Sa/Da) indicates that the surface of the cured layer is more hydrophilic and the inventive cured product (typically, a film including the cured product) can be used more advantageously as a hydrophilic material (typically, a hydrophilic film). Regarding the term Da, the phrase "the middle point between the interface in contact with the substrate and the outer surface" usually means the point at a depth of ½ film thickness from the outer surface toward the interface in contact with the substrate. (In the specification, this point will be also written as the "point at ½ film thickness".) In the explanation of Sa and Da, the terms "sulfonate" and "sulfonate concentration" mean "—$SO_3M$ group" and "concentration of the —$SO_3M$ groups", respectively.

In a cured product obtained by curing the composition of the invention (typically, a film including the cured product), the gradient {the ratio of the sulfonate concentrations (Sa/Da)} is usually in the range of 1.01 to 1000, preferably in the range of 1.1 to 100, and more preferably in the range of 1.2 to 60. The lower limit of the gradient is more preferably 1.1 or above. If the gradient exceeds 1000, the reaction between the hydroxymethyl groups (alkoxysilyl groups) in the amino resin (ii) and the highly hydrophilic copolymer (i) (the incorporation of oxymethylamino bonds into the network) tends to be incomplete, and toughness, transparency and durability (the ability to maintain hydrophilicity) tend to be decreased.

The thickness of a film that includes a cured product formed by curing the inventive composition on a substrate is not particularly limited, but is approximately in the range of 0.0001 to 3000 μm, preferably in the range of 0.01 to 300 μm, and more preferably in the range of 0.1 to 30 μm.

In the invention, the above cured product (typically, the film) having a gradient of the sulfonate concentration exhibits a further increased level of hydrophilicity. While a cured product without a gradient of the sulfonate concentration (for example, gradient Sa/Da=1) exhibits high hydrophilicity, the level of hydrophilicity is lower than when the sulfonate concentration has a gradient. In order for a cured product without a gradient of the sulfonate concentration (for example, gradient Sa/Da=1) to attain the same level of hydrophilicity as when there is a gradient of the sulfonate concentration, a larger amount of the hydrophilic copolymer (i) is necessary. Thus, the presence of a gradient of the sulfonate concentration in a cured product (typically, a film including the cured product) makes it possible to achieve high hydrophilicity and also to attain enhanced properties such as hardness, scratch resistance, abrasion resistance and durability (the ability to maintain hydrophilicity) by virtue of the high density of crosslinks by oxymethylamino bonds.

In a cured product obtained by curing the inventive composition (typically, a film including the cured product), the presence of a gradient of the concentration of the —$SO_3M$ groups probably leads to a further enhancement in the balance between hydrophilicity (such as water contact angle) and hardness of the cured product.

The composition which includes the copolymer (i) and the amino resin (ii) capable of reacting with the copolymer (i) usually contains the copolymer (i), the amino resin (ii), inorganic particles, a catalyst and a solvent which can dissolve or allows to disperse these components homogeneously.

The solvent may be any type of a solvent as long as the components can be dissolved or dispersed uniformly. The solvents may be used singly, or two or more may be used in combination.

When a cured product obtained by curing the inventive composition (typically, a film including the cured product) is to have a gradient of the hydrophilic copolymer (i) in the thickness direction (when the sulfonate groups are to be concentrated at the surface of the cured product), it is preferable to use a highly polar solvent having a high SP value (solubility parameter σ), more specifically, it is preferable to use one or more solvents having an SP value (solubility parameter σ) of at least 9.3 or above.

When a cured product having a gradient of the sulfonate concentration is to be formed using a solvent with an SP value of less than 9.3, it is preferable that such a solvent be used in combination with a solvent with an SP value of 9.3 or above and have a lower boiling point (be evaporated at a higher rate) than the solvent with an SP value of 9.3 or above.

In the invention, the SP value (solubility parameter σ) of a solvent $(cal/cm^3)^{1/2}$ is a value calculated using the equations (1) to (5) below.

Latent heat of vaporization per 1 mol: $Hb=21\times(273+Tb)$ [unit: cal/mol], $Tb$: boiling point (° C.) of solvent (1)

Latent heat of vaporization per 1 mol at 25° C.: $H25=Hb\times\{1+0.175\times(Tb-25)/100\}$ [unit: cal/mol], $Tb$: boiling point (° C.) of solvent (2)

Intermolecular binding energy: $E=H25-596$ [unit: cal/mol] (3)

Intermolecular binding energy per 1 ml (cm3) of solvent: $E1=E\times D/Mw$ [unit: cal/cm$^3$], $D$: density (g/cm$^3$), Mw: molecular weight of solvent (4)

SP value: Solubility parameter $\sigma=(E1)^{1/2}$ [unit: (cal/cm$^3$)$^{1/2}$] (5)

A solvent having an SP value (solubility parameter σ) (cal/cm$^3$)$^{1/2}$ of not less than 9.3 has a certain interaction with the hydrophilic sulfonate-containing groups derived from the copolymer (i). When the mixture is applied onto a substrate and the solvent is removed from the mixture, the copolymer (i) having the hydrophilic sulfonate-containing groups is carried by the solvent being moved toward the surface of the coating of the mixture in contact with the outside air. Consequently, the hydrophilic sulfonate-containing groups are concentrated at the surface, and a cured product (typically, a film) obtained in the invention attains a graded structure in which the hydrophilic sulfonate-containing groups are concentrated at the outer surface.

If, on the other hand, the solubility parameter σ $(cal/cm^3)^{1/2}$ is less than 9.3, the above interaction becomes weak and consequently the graded structure is not formed sufficiently. To facilitate the formation of such a graded structure, the solubility parameter σ $(cal/cm^3)^{1/2}$ is preferably not less than 9.3, more preferably not less than 10, and still more preferably not less than 11.

In the invention, curing is mainly effected by heating. Thus, the graded structure is usually formed and fixed (cured) by evaporating the solvent in conformity to the heating conditions (such as temperature, time, catalyst, curing agent and air flow rate). To ensure that curing occurs while the aforementioned graded structure is formed, the solvent tends to be selected based on the boiling point (the rate of evaporation) as a guide in conformity to the curing temperature. Specifically, those solvents having a boiling point of 30 to 300° C. are preferable, those solvents having a boiling point of 40 to 250° C. are more preferable, and those solvents having a boiling point of 50 to 210° C. are still more preferable. When a mixed solvent including two or more kinds of solvents is used, the highest boiling point of the solvents in the mixed solvent is suitably in the above range.

Examples of the solvents that have a solubility parameter σ $(cal/cm^3)^{1/2}$ of not less than 9.3 and a boiling point of 50 to 210° C. and may be used as the solvents include those solvents categorized into alcohols, ketones, carboxylic acids, carboxylate esters, ethers, amides, nitriles and water. Specific examples of the solvents include those solvents described in paragraph [0167] of WO 2014/168122.

Of the solvents, water having the highest solubility parameter σ $\{21.4 \ (cal/cm^3)^{1/2}\}$, and alcohols are preferable.

Of the alcohols, primary alcohols tend to be preferable, with examples including methanol, ethanol, 1-propanol, 2-methoxyethanol (EGM), 2-ethoxyethanol, 2-methoxypropanol (PGM), 1-butanol, 1-pentanol, 2-methyl-1-butanol and 1-pentanol. These alcohols may be used singly, or are preferably used as a mixture with water.

The solvents with a solubility parameter σ $(cal/cm^3)^{1/2}$ of not less than 9.3, which are some of the solvents usable in the invention, may be used singly, or two or more may be used in combination.

When the solvent is a mixed solvent including two or more kinds of solvents, at least one solvent suitably satisfies the above solubility parameter conditions. Provided that one of the solvents in the mixed solvent satisfies the solubility parameter conditions, that one solvent has a certain interaction with the hydrophilic sulfonate-containing groups derived from the copolymer (i). When such a mixture is applied onto a substrate and the solvent is removed from the mixture, the copolymer (i) having the hydrophilic sulfonate-containing groups is similarly carried by the one solvent being moved toward the surface of the coating of the mixture in contact with the outside air. Consequently, the hydrophilic sulfonate-containing groups are concentrated at the surface.

In the case of a mixed solvent including two or more kinds of solvents, the solvent with the highest boiling point tends to have a large influence on the formation of a graded structure. Thus, it is preferable that the solubility parameter σ $(cal/cm^3)^{1/2}$ of the solvent with the highest boiling point in the mixed solvent be not less than 9.3.

When solvents having a solubility parameter of not less than 9.3 are mixed together, it is preferable that the solubility parameters of the solvents (the polarity of the solvents) be as high as possible. Further, the formation of a cured product whose surface is enriched with sulfonate is advantageously facilitated when the solubility parameter σ $(cal/cm^3)^{1/2}$ of a solvent with a higher boiling point is higher than that of a solvent with a lower boiling point.

In a mixed solvent including two or more kinds of solvents, the weight ratio of a solvent with the highest solubility parameter to the other solvent(s) is preferably in the range of 99.9/0.1 to 1/99, more preferably 99/1 to 10/90, and still more preferably 98/2 to 30/70.

Attention is required when using a mixed solvent including water and a solvent other than water. Specifically, when the solvent other than water is a low-polarity solvent that is immiscible with water, or when the amount of water is large, or when the solvent has an evaporation rate that is unnecessarily faster than that of water (i.e., the solvent has a far lower boiling point), the composition of the invention that has been applied tends to form droplets to cause problems such as a decrease in leveling properties and consequently the solvent removal step may result in a failure to form a cured product (typically, a film including the cured product) that is transparent and has a smooth surface. When a mixed solvent including water is used, it is first important to select a highly polar solvent which is easily mixed with water so that the composition of the invention will form a uniform solution or a uniform dispersion. To obtain a cured product (typically, a film including the cured product) that is transparent and has a smooth surface, the weight ratio of water to the solvent (s) other than water is relatively preferably 80/20 to 1/99, more preferably 70/30 to 5/95, and still more preferably 60/40 to 10/90.

The solvent that is mixed with water, namely, the solvent other than water may be selected from highly polar solvents having a solubility parameter σ $(cal/cm^3)^{1/2}$ of not less than 9.3. Alternatively, the solvent may be selected based on the ratio R of evaporation rate (the rate of evaporation relative to that of water) at an actual temperature in the solvent removal step. Specifically, preferred solvents are those with a ratio R of evaporation rate in the range of 0.1 to 2.0 relative to water at an actual temperature in the solvent removal step. Those solvents with a ratio R of evaporation rate in the range of 0.2 to 1.8 are more preferable, and those solvents with a ratio R of evaporation rate in the range of 0.3 to 1.5 are still more preferable.

In the invention, the ratio R of evaporation rate is calculated using the simplified equations (A) and (B) described below.

Evaporation rate=Saturated vapor pressure at solvent removal temperature (mmHg)×√(molecular weight)　　　(A)

Ratio $R$ of evaporation rate relative to water=Evaporation rate of solvent other than water/Evaporation rate of water　　　(B)

For example, the evaporation rate of water at 50° C. is calculated to be 92.6, and the ratios R of evaporation rate of some typical solvents which may be removed at 50° C. are roughly calculated as follows.

For example, methanol=4.3, ethanol=2.4, IPA (2-propanol)=1.8, 1-propanol=1.0, 1-butanol=0.4, EGM (methoxyethanol)=0.4, and EGE (ethoxyethanol)=0.3.

Another aspect of the invention resides in a cured product (typically, a film including the cured product) that is disposed on a substrate and has —$SO_3M$ groups (wherein M denotes a hydrogen atom, an alkali metal, an alkaline earth metal or an ammonium ion) and M-$CH_2$—O structures. In such a cured product (typically, a film including the cured product), the ratio (Sa/Da) is 2 to 1000 wherein Sa is the concentration of the $SO_3M$ groups at the outer surface of the cured product, and Da is the concentration of the $SO_3M$ groups at the middle point between the interface in contact with the substrate and the outer surface.

In the cured product of the invention (for example, a film including the cured product), the gradient {the ratio of the sulfonate concentrations (Sa/Da)} is usually in the range of 1.01 to 1000, preferably in the range of 1.1 to 100, and more preferably in the range of 1.2 to 60. In any cases, the lower limit is more preferably 1.1 or above.

The above cured product of the invention has hydrophilicity and also attains excellent properties such as hardness, abrasion resistance and weather resistance by virtue of its having N—$CH_2$—O structures.

A cured product of the invention, for example, a film including the cured product, may be formed by curing the composition including the copolymer (i) and the amino resin (ii). In the invention, the term curing may typically mean that, for example, the solvent has been removed from the composition and the composition has reduced or lost its solubility with respect to solvents. When the composition used in the invention which includes the copolymer (i) and the amino resin (ii) has been cured, the cured product typically has a network (a crosslinked structure) based on oxymethylamino bonds formed by the reactions of groups present in the composition (typically, epoxy groups, alkoxysilyl groups, and hydroxymethyl groups.

The curing is preferably performed by, for example, heating. The heating temperature is approximately in the range of 30 to 300° C., preferably in the range of 40 to 200° C., and more preferably in the range of 50 to 180° C. The heating time is usually in the range of 0.02 hours to 200 hours, preferably 0.1 hour to 8.0 hours, and more preferably 0.3 hours to 4.0 hours.

The curing is possible by a method other than heating. For example, the composition including the copolymer (i) and the amino resin (ii) may be cured by the irradiation of microwaves (typical example: frequency 2.45 GHz, wavelength=12.2 cm) that are a type of radiations.

For example, an appropriate compound such as a known polyfunctional (meth)acrylate, a known polyfunctional epoxy compound or a known polyfunctional vinyl compound, and optionally an initiator such as a UV radical polymerization initiator or a UV cat ionic polymerization initiator may be added to the composition, and the composition may be cured by being irradiated with ultraviolet (UV) rays that are a type of radiations.

When the curing involves radiations, the application of radiations is preferably performed in combination with heating in order to ensure that a network based on oxymethylamino bonds will be formed reliably in the cured product.

The radiations used for curing may be energy rays having a wavelength in the range of 0.0001 to 800 nm. Such radiations are divided into, for example, α rays, β rays, γ rays, X rays, electron beams, ultraviolet rays, visible lights and microwaves, and may be selected appropriately in accordance with factors such as the proportions of the copolymer (i) and the amino resin (ii). Of these radiations, ultraviolet rays are preferable. The output peak of ultraviolet rays is preferably in the range of 200 to 450 nm, more preferably in the range of 210 to 445 nm, still more preferably in the range of 220 to 430 nm, and particularly preferably in the range of 230 to 400 nm. The use of ultraviolet rays having an output peak in the above range ensures that curing takes place with little problems such as yellowing and thermal deformation, and completes in a relatively short time even when the composition contains a UV absorber. As the ultraviolet lamp, an electrodeless UV (ultraviolet) lamp which emits little infrared rays and has a high intensity is more preferable than a usual electrode UV (ultraviolet) lamp. In the case where the composition including the copolymer (i) and the amino resin (ii) further contains a UV absorber or HALS, it tends to be preferable to use an ultraviolet lamp having a peak output intensity in the range of 240 to 270 nm.

The curing of the composition including the copolymer (i) and the amino resin (ii) may be performed in an inert gas atmosphere such as a nitrogen atmosphere, but preferably takes place in an air atmosphere. The humidity in the atmosphere is preferably as low as possible because the surface of a cured product tends to be nonuniform at a high humidity. Preferably, the humidity is approximately in the range of 20 to 70% RH, more preferably in the range of 30 to 60% RH, and still more preferably in the range of 40 to 60% RH.

An example of the cured products is a film (Z1) having a thickness of greater than 100 nm (0.1 μm). Films having such a thickness have excellent abrasion resistance and durability, and are therefore suitably used as interior or exterior coats on buildings and transport machines (vehicles, ships and aircrafts), interior or exterior coats on home appliances and electronics, and coats on components such as accessories and parts used in the above items. In particular, the films are useful in outdoor coatings and similar applications which require weather resistance.

The above thick film with a thickness of greater than 100 nm (0.1 μm) can provide a hard surface when applied to coat a film that represents an example of the cured products, without being much affected by the substrate. (In general, a film disposed on a soft substrate is prone to flaws due to the influence of the substrate.) Such a surface-coating film with high hardness is resistant to scratches. Even if the surface is more or less worn by an unexpectedly high stress or the like, the film itself remains in most cases and tends to retain its performance (namely, attains an enhanced durability).

The film (Z1) may be formed by, for example, applying the composition including the copolymer (i) and the amino resin (ii) onto a substrate described later, and curing the composition.

Examples of the methods for applying the composition onto a substrate include brush coating methods, spray coating methods, wire bar methods, bar coater methods, blade methods, roll coating methods, spin coating methods, dipping methods and other known coating methods.

The mass of coating may be selected appropriately so that the film (Z1) will have the desired thickness.

When hardness is not required, the thickness of the film (Z1) is above 0.001 μm (1 nm) and not more than 0.1 μm (100 nm). When hardness is required, the thickness is approximately above 0.1 μm (100 nm) and not more than 500 μm, preferably above 0.1 μm and not more than 100 μm, and more preferably 1 to 50 μm.

When used in, for example, outdoor coatings, the thickness of the film (Z1) tends to be relatively large, and is approximately in the range of above 0.1 μm (100 nm) and not more than 500 μm, preferably in the range of not less than 1 μm and not more than 200 μm, and still more preferably in the range of not less than 3 μm and not more than 100 μm.

By applying the composition including the copolymer (i) and the amino resin (ii) onto an object such as a substrate by the aforementioned method and curing the composition, a stack may be formed which has at least one layer (Z1) including a film (Z1), and the substrate. This stack may be used as such.

Examples of the materials of the substrates include organic materials such as PMMA, polycarbonate (PC), PET, ABS, triacetylcellulose (TAC), polyvinyl chloride (PVC), polyethylene (PE), polypropylene (PP), polylactic acid (PLA), poly(thio)urethane resin, poly(thio)urea resin and (thio)epoxy resin, inorganic materials such as glass, iron, stainless steel, aluminum, nickel, zinc, gold, silver, copper, metal oxide, ceramic, cement, slate, marble, granite and mortar, and composite materials such as SMC (sheet molding compounds) that are composites between an inorganic material such as glass fibers or calcium carbonate and an organic material such as unsaturated polyester resin.

Organic substrates, inorganic substrates and composite substrates made of these organic materials, inorganic materials and composite materials, respectively, may be used directly or after being subjected to various surface treatments. For example, surface treatment can increase the adhesion between the substrate and a layer including a film (Z). Examples of such surface-treated substrates include substrates the surface of which has been plated with a metal, substrates the surface of which has been chemically treated with a chemical reagent such as an aqueous zinc phosphate solution, corona-treated substrates, plasma-treated substrates, glow-discharged substrates, flame-treated substrates, ITRO-treated substrates, primer-treated substrates, undercoated substrates and anchor-coated substrates.

Examples of the coating agents used in the above primer treatment, undercoating treatment or anchor coating treatment include those coating agents which have a vehicle based on a resin, for example, polyester resin, polyamide resin, polyurethane resin, epoxy resin, phenolic resin, (meth) acrylic resin, polyvinyl acetate resin, polyolefin resin such as polyethylene or polypropylene or a copolymer or modified resin thereof, or cellulose resin. The coating agents may be solvent-based coating agents or aqueous coating agents.

Of these, preferred coating agents are silane coupling agent coating agents, silane coupling agent-filler mixed coating agents, modified polyolefin coating agents, ethylvinyl alcohol coating agents, polyethyleneimine coating agents, polybutadiene coating agents, polyurethane coating agents; polyester polyurethane emulsion coating agents, polyvinyl chloride emulsion coating agents, urethane acrylic emulsion coating agents, silicon acrylic emulsion coating agents, vinyl acetate acrylic emulsion coating agents, acrylic emulsion coating agents;

rubber latex coating agents, polyacrylate ester latex coating agents, polyvinylidene chloride latex coating agents and polybutadiene latex coating agents such as styrene-butadiene copolymer latex coating agents, acrylonitrile-butadiene copolymer latex coating agents, methyl methacrylate-butadiene copolymer latex coating agents, chloroprene latex coating agents and polybutadiene latexes, and coating agents that are latexes or dispersions of carboxylated products of the resins in the above latex coating agents.

For example, the coating agent may be applied by a method such as a gravure coating method, a reverse roll coating method, a knife coating method or a kiss coating method. The mass of coating onto the substrate is usually 0.005 g/m² to 5 g/m² on dry basis.

Of the coating agents, more preferred coating agents are silane coupling agent coating agents, silane coupling agent-filler mixed coating agents, and polyurethane coating agents represented by commercially available "TAKELAC™" and "TAKENATE™" (both manufactured by Mitsui Chemicals, Inc.).

The silane coupling agent coating agents and the silane coupling agent-filler mixed coating agents are characterized in that the coating agents contain a silane coupling agent. Typical examples of the silane coupling agents contained in the coating agents include vinyltrichlorosilane, vinyltrimethoxysilane, vinyltriethoxysilane, 2-(3,4-epoxycyclohexyl)ethyltrimethoxysilane, 3-glycidyloxypropyltrimethoxysilane, 3-glycidyloxypropyltriethoxysilane, 3-glycidyloxypropyl-methyl-dimethoxysilane, 4-styryltrimethoxysilane, (meth)acryloyloxypropyl-methyl-dimethoxysilane, (meth)acryloyloxypropyl-trimethoxysilane, (meth)acryloyloxypropyl-triethoxysilane, N-(2-aminoethyl)-3-aminopropyl-trimethoxysilane, N-(2-aminoethyl)-3-aminopropyl-methyl-dimethoxysilane, N-(2-aminoethyl)-3-aminopropyl-triethoxysilane, 3-aminopropyl-trimethoxysilane, 3-aminopropyl-triethoxysilane, 3-triethoxysilyl-N-(1,3-butylidene)propylamine, N-phenyl-3-aminopropyl-trimethoxysilane, 3-ureidopropyl-triethoxysilane, 3-chloropropyltrimethoxysilane, 3-mercaptopropyl-trimethoxysilane, 3-mercaptopropyl-methyl-dimethoxysilane, bis(triethoxysilylpropyl)tetrasulfide, bis(trimethoxysilylpropyl)amine, bis(triethoxysilylpropyl) amine, N,N'-bis(trimethoxysilylpropyl)ethylenediamine, N,N'-bis(triethoxysilylpropyl)ethylenediamine, N,N',N''-tris(trimethoxysilylpropyl)-isocyanurate, 3-isocyanatopropyltrimethoxysilane and 3-isocyanatopropyltriethoxysilane.

Of the above silane coupling agents, those silane coupling agents having an epoxy group, a mercapto group or an amino group are relatively preferable, those silane coupling agents having an amino group are more preferable, and bis(trimethoxysilylpropyl)amine, bis(triethoxysilylpropyl) amine, N,N'-bis(trimethoxysilylpropyl)ethylenediamine and N,N'-bis(triethoxysilylpropyl)ethylenediamine are most preferable.

The polyurethane coating agents have urethane bonds in the main chains or side chains of the resin in the coating agent. Examples of the polyurethane coating agents include those coating agents that contain a polyurethane obtained by the reaction of a polyol such as polyester polyol, polyether polyol or acrylic polyol with an isocyanate compound.

Of the polyurethane coating agents, those polyurethane coating agents obtained by mixing a polyester polyol such as condensed polyester polyol or lactone polyester polyol with an isocyanate compound such as tolylene diisocyanate, hexamethylene diisocyanate, isophorone diisocyanate, norbornane diisocyanatomethyl or xylene diisocyanate are preferable because of their excellent adhesion.

The polyol compound and the isocyanate compound may be mixed together by any method without limitation. Although the ratio of these compounds is not particularly limited, insufficient curing may result if the amount of the isocyanate compound is excessively small. Thus, the equivalent weight ratio of the OH groups in the polyol compound and the NCO groups in the isocyanate compound is suitably in the range of 2/1 to 1/40. A known silane coupling agent may be added to the polyol compound and the isocyanate compound.

The thickness of a film of the coating agent formed by the aforementioned primer treatment, undercoating treatment or anchor coating treatment may be selected appropriately in accordance with factors such as the purpose of use. When, for example, the coating agent is applied onto an optical substrate that is frequently required to exhibit antireflection properties, the thickness is approximately in the range of 0.0001 µm (0.1 nm) to 0.1 µm (100 nm), and more preferably in the range of 0.001 µm (1 nm) to 0.05 µm (50 nm). When, for example, the coating agent is applied onto a substrate other than optical substrates, the thickness is approximately in the range of 0.1 to 400 µm, more preferably in the range of 0.5 to 200 µm, and still more preferably in the range of 1 to 100 µm.

The surface treatment may be performed for a purpose other than to enhance adhesion, for example, for the purpose of imparting antireflection properties. Examples of the substrates with such surface treatment include grazed substrates having fine irregularities on the surface. Further, use may be made of a coated substrate obtained by applying a coating onto the surface of the treated substrate to form a film.

The substrates described above may be used singly, or may be used in the form of a laminate substrate in which a plurality of substrates selected from the organic substrates, the inorganic substrates and the composite substrates are stacked on top of one another.

For example, optical substrates used in optical articles and optical devices such as lenses, eyeglasses, cameras, display devices (displays) and projectors may be transparent substrates that are made of transparent materials selected from the aforementioned organic materials, inorganic materials and hybrid materials.

A stack having the substrate and the layer (Z1) may have various functional layers.

Examples of such functional layers include hard coat layers and antireflection (AR) layers.

Examples of the hard coat layers include layers formed of acrylic materials and layers formed of silica materials.

Examples of the antireflection layers include layers formed of low-refractive index materials, and multilayered antireflection layers that are alternate stacks of low-refractive index layers and high-refractive index layers.

Such a functional layer may be disposed on the outer sides of the substrate and the layer (Z1), or may be disposed between the substrate and the layer (Z1), for example, on the substrate. In a preferred embodiment, for example, a hard coat layer or an antireflection layer is disposed between the substrate layer and the layer (Z1), for example, on the substrate.

The stack of the invention may have a plurality of functional layers described above.

In general, optical applications frequently require that the stack have high transparency. In such cases, it tends to be desirable that each layers in the stack be as thin as possible. The functional layers may be introduced into the stack by a known method.

In a preferred embodiment, the stack is fabricated in such a manner that a layer in contact with the layer (Z1) including the inventive film (Z1) is based on $SiO_2$. In this manner, the obtainable stack tends to attain excellent adhesion of the layer (Z1).

When, in particular, the stack has an optical substrate and a layer (Z1), the strong demand for antifogging properties is advantageously satisfied by controlling the proportions of the structural units a represented by the formula (1), the structural units b represented by the formula (2) and the structural units c represented by the formula (3) in the copolymer (i). Specifically, high hydrophilicity is advantageously obtained when the structural units a represented by the formula (1) have a high proportion. In detail, it is preferable that the structural units a represented by the formula (1) be in the range of 99.0 to 60.0, the structural units b represented by the formula (2) be in the range of 0.5 to 20.0, and the structural units c represented by the formula (3) be in the range of 0.5 to 20.0, and it is more preferable that a be in the range of 98.0 to 70.0, b be in the range of 1.0 to 15.0, and c be in the range of 1.0 to 15.0.

A higher weight ratio of the copolymer (i) to the amino resin (ii), (i)/(ii), namely, a higher proportion of the copolymer (i) tends to be preferable for the similar reasons as described above. The weight ratio is preferably in the range of 99/1 to 40/60, and more preferably in the range of 95/5 to 60/40.

In the stack, for example, the film (Z1) is an antifogging film, an antifouling film or an antistatic film. That is, the stack includes a substrate coated with such an antifogging film, an antifouling film or an antistatic film.

When, for example, the substrate is a film, a self-adhesive layer described later may be provided on the surface on which the film of the invention is not disposed. Further, a release film may be provided on the surface of the self-adhesive layer. Such self-adhesive layers laminated on the surface of the substrate films opposite to the inventive film allow users to attach easily the stack films including the inventive film, as antifogging films or antifouling films onto objects such as glasses, mirrors in bathrooms and the like, surfaces of display devices such as displays and televisions, information boards such as signboards, advertisements and guideboards, signs such as railroad signs and traffic signs, exterior walls of buildings, and window glasses.

The pressure-sensitive adhesives used to form the self-adhesive layers in structures such as stacks are not particularly limited, and known pressure-sensitive adhesives may be used. Examples of the pressure-sensitive adhesives include acrylic pressure-sensitive adhesives, rubber pressure-sensitive adhesives, vinyl ether polymer pressure-sensitive adhesives and silicone pressure-sensitive adhesives. The thickness of the self-adhesive layers is usually in the range of 2 to 50 µm, and preferably in the range of 5 to 30 µm.

In the inventive film (Z1) and a stack including the film, the surface of the film in contact with the air may be covered with a covering material. The covering material disposed on the film itself or on the film constituting a stack can prevent the film from being scratched or fouled during actions such as transportation, storage and laying out.

To ensure that the composition including the copolymer (i) and the amino resin (ii) can be cured by, for example, heating or infrared irradiation while the surface of the composition that has been applied is protected from airborne dust and contaminants, the heating or infrared irradiation may take place while the covering material described above is disposed in contact with the coating. In this manner, the covering material can constitute a portion of the stack including the base, namely, the substrate, and the inventive film disposed thereon and thereby serves to prevent the film from scratches and fouling.

Examples of the materials suitably used as the covering materials (typically, films) include vinyl alcohol polymers such as polyvinyl alcohol (PVA) and ethylene•vinyl alcohol copolymer, polyacrylamides, polyisopropylacrylamides, polyacrylonitriles, polycarbonates (PC), polymethyl methacrylates (PMMA), polyethylene terephthalates (PET), polystyrenes (PS) and biaxially oriented polypropylenes (OPP).

By approaches such as appropriate selection of the shape of the substrate, the stacks of the present invention may be produced with various forms. The films (Z1) and the stacks obtained by the invention may be used in the form of, for example, films, sheets and tapes. The film (Z1) may be used also as a primer layer.

The composition including the copolymer (i) and the amino resin (ii) may be cured in molds having various shapes. In this manner, cured products such as films and articles may be formed with various shapes.

The films (Z1) obtained by the invention have excellent hydrophilicity, durability, abrasion resistance and weather resistance and exhibit high antifogging properties, antifouling properties, antistatic properties and quick dry properties (quick evaporation of water).

The films (Z1) obtained by the invention usually have a water contact angle of not more than 30°, preferably not more than 20°, and more preferably not more than 10°. This upper limit of the water contact angle ensures that the film exhibits high hydrophilicity and is an excellent hydrophilic material that has strong affinity for (wettability with) water.

Cured products of the invention obtained by curing the composition including the copolymer (i) and the amino resin (ii), for example, the films (Z1) including the cured products desirably have a change in water contact angle between before and after being ultrasonicated in 25° C. water for 10 minutes of usually not more than 20°, preferably not more than 10°, and more preferably not more than 5°. The satisfaction of this condition indicates that the composition used in the invention which includes the copolymer (i) and the amino resin (ii) and is soluble in water or has strong affinity for water has become less prone to dissolve in water (has become sufficiently cured) as a result of the reactions of the groups present in the composition having proceeded sufficiently to form a network or a fixed structure. The cured products having such characteristics may be prepared by curing the composition by a method such as heating as described hereinabove.

Thus, the films (Z1) obtained by the invention are useful as, for example, antifogging materials, antifogging films (hereinafter, also written as antifogging coats), antifouling materials, antifouling films or self-cleaning coats, antistatic materials, quick-dry materials or quick-dry coats, and antistatic films or anti-dust coats.

When used as, for example, an antifogging coat, the film of the invention allows water droplets to spread on the surface to form a water film, thus achieving excellent antifogging effects. When used as a self-cleaning coat, the film allows water to penetrate into between the dirt and the coating surface to lift and remove the dirt, thus attaining excellent antifouling effects. Further, the film of the invention has excellent antistatic properties and is useful also as an antistatic material, an antistatic film, an anti-dust coat or the like.

The stacks obtained by the invention have excellent hydrophilicity and durability and are useful as antifogging materials, antifouling materials, antistatic materials or the like. For example, a stack obtained by stacking the inventive film onto a substrate made of a transparent material such as transparent resin or glass may be used as a stack having excellent transparency, hydrophilicity, antifogging properties, antifouling properties, antistatic properties, quick-dry properties, anti-condensation properties, weather resistance and abrasion resistance.

Thus, cured products obtained by curing the inventive composition, and films and stacks including the cured products may be used in various applications including articles in transport machines represented by automobiles, ships and aircrafts, such as bodies, wheels, exterior items and interior items; articles in buildings and houses represented by kitchens, bathrooms and pipes, such as exterior wall items, interior wall items, floors, furniture, bathroom items, lavatory and restroom items, sinks, fans and oven peripheral parts; construction articles such as sound insulating boards located at places such as expressways; clothing articles such as garments, cloths and fibers; optical articles and optical devices such as windows, mirrors, optical films, optical discs, contact lenses, goggles, reflective films, reflective plates, eyeglasses, sunglasses, cameras, lenses, antireflection films, display devices (displays such as touch panels, flat panels and electronic papers), projectors and shields; dental materials such as dentures; lighting articles such as lamp items and lighting items; industrial articles such as fins for cooling and heat exchange; articles in electric and electronic products such as items in electronics and wiring items; printing articles such as inkjet recording plates and printing or typing primers; and commodities such as cosmetic containers.

EXAMPLES

Hereinbelow, the present invention will be described in further detail by discussions such as examples. The scope of the invention is not limited to such examples.

In the invention, the structures of copolymers (i) were evaluated as described below.
(Proportions of Components in Copolymer)

The unit ratio (1)/(2)/(3) was analyzed by $^{13}$C-NMR wherein (1) denotes units having a sulfonate-containing group, (2) units having an epoxy group, and (3) units having a trialkoxysilyl group. The measurement conditions are described below.
(Measurement Conditions)
    Apparatus: Nuclear magnetic resonance apparatus AVANCE III cryo-500 manufactured by Bruker BioSpin K.K.
    Nucleus observed: $^{13}$C (125 MHz)
    Measurement mode: single pulse proton broad band decoupling
    Pulse width: 45° (5.0 μsec)
    Points: 64K
    Measurement range: −25 to 225 ppm
    Scans: 1000
    Measurement solvent: $D_2O$
    Measurement temperature: room temperature
    Sample concentration: 40 mg/0.6 ml-$D_2O$
(Analysis of Unit Ratio (1)/(2)/(3))

The ratio was calculated as the ratio of the integrated intensities of the peak of carbon f in the formula (200) below (near 57 to 59 ppm), the peak of carbon k in the formula (300) below (near 51 to 52 ppm), and the peak of carbon t in the formula (400) below (near 4 to 6 ppm). Specifically, unit ratio (1)/(2)/(3)=integrated intensity of peak of carbon f/integrated intensity of peak of carbon k/integrated intensity of peak of carbon t.

[Chem. 30]

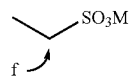

(200)

(300)

-continued

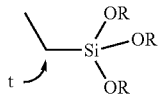
(400)

(Weight Average Molecular Weight (Mw) and Molecular Weight Distribution (Mw/Mn))

The Mw (weight average molecular weight), and the ratio of the weight average molecular weight (Mw) to the number average molecular weight (Mn), namely, the molecular weight distribution Mw/Mn, were analyzed by GPC. The measurement conditions are described below.
(Measurement Conditions)
   Apparatus: GPC-900 manufactured by JASCO Corporation
   Column: ShodexAsahipac "GF-7M HQ" manufactured by SHOWA DENKO K.K., ϕ7.5 mm×300 mm
   Measurement temperature: 40° C.
   Eluting solution: water/methanol/NaHPO$_4$/NaHPO$_4$.2H$_2$O=850.0/150.0/2.7/7.3 (by weight)
   Flow rate: 0.5 ml/min.
   Calibration of molecular weight: polymethyl methacrylates having known molecular weights In the invention, the properties of coating films were evaluated as described below.
(Appearance)

The transparency of coating films obtained was visually evaluated.
(Measurement of Water Contact Angle)

The water contact angle was measured with respect to 3 sites for each sample with use of water contact angle meter CA-V manufactured by Kyowa Interface Science Co., Ltd. The water contact angles measured were averaged.
(Measurement of Haze)

The haze was measured with respect to 4 sites for each sample with use of haze meter NDH2000 manufactured by NIPPON DENSHOKU INDUSTRIES CO., LTD. The haze values measured were averaged.
(Test of Fouling by Heating at 120° C.)

A test piece was held in a hot air dryer at 120° C. for 12 hours. After the test piece had been cooled to room temperature, the surface was washed under running water while rubbing the surface with BEMCOT (Asahi Kasei Corporation). The test piece was dried with an air gun. The evaluation sample thus prepared was evaluated by comparing the water contact angles measured before and after the testing. The sample was judged to have been contaminated more heavily as the increase (gap) in water contact angle was larger.
(Pencil Hardness)

The test was performed in accordance with JIS 1(5600-5-4: Scratch hardness (Pencil method).
(Evaluation of Antifogging Properties)

The resistance to fogging was evaluated as ○ when a sample did not become fogged with breath, as Δ when the sample became slightly fogged, and as x when the sample became fogged.
(Evaluation of Antifouling Properties)

The surface was marked with oil-based marker "Mackee Gokuboso (ultrafine)" (black, code: MO-120-MC-BK) manufactured by ZEBRA CO., LTD. Water droplets were dropped on the marked surface, allowed to stand for 30 seconds, and wiped with tissue paper. The antifouling properties were evaluated as ○ when the mark was removed, as Δ when the mark slightly remained, and as x when the mark could not be wiped off.
(Test of Adhesion)

The test was carried out in accordance with JIS 1(5600-5-6 (Adhesion test—Cross-cut test). For the evaluation, the number of squares that were not separated (remained attached) per 25 squares was converted to the number per 100 squares.
(Taber Abrasion Test (JIS K 7204))

Before the test, the haze of a sample was measured by the aforementioned method. Thereafter, the sample was subjected to a Taber abrasion test under the following conditions in accordance with JIS K 7204. After the Taber abrasion test, the sample was analyzed to measure the haze. The sample was evaluated to be less resistant to abrasion (to be worn more easily) with larger increase in haze.
(Conditions of Taber Abrasion Test)
   Measurement device: Rotary abrasion tester, TOYO SEIKI SEISAKU-SHO, LTD.
   Abrasive wheels: C180 OXF
   Load: 500 g (250 g+250 g)×2
(Measurement of Gradient)

A sample having a coat layer 20 on a substrate 10 was cut at a bevel as illustrated in the sample preparation in FIG. 2. With use of a time-of-flight secondary ion mass spectrometer (TOF-SIMS), the sample was analyzed to measure the sulfonate concentration (Sa) at the outer surface and the sulfonate concentration (Da) at the middle point between the interface in contact with the substrate 10 and the outer surface. The ratio of the sulfonate concentration at the outer surface of the film in contact with the air, to the concentration at the middle point between the inner surface and the outer surface of the film was calculated as the gradient (Sa/Da). Here, the sample corresponds to an inventive stack, and the coat layer 20 corresponds to an inventive film.
(Analyzer and Measurement Conditions)
   TOF-SIMS: TOF-SIMS 5 manufactured by ION•TOF
   Primary ions: Bi$_3^{2+}$ (accelerating voltage 25 kV)
   Measurement area: 300 to 340 μm$^2$. In the measurement, an electron gun for correcting electric charges was used.
Preparation and Analysis of Sample As illustrated in FIG. 2, a sample in which a coat layer 20 was disposed on a surface of a substrate 10 was cut at a bevel accurately in a cutting direction 30. Thereafter, an approximately 10 mm×10 mm piece was cut out, and a mesh was placed on the measurement surface. The sample was then fixed to a sample holder, and the concentration of sulfonate groups was measured with the time-of-flight secondary ion mass spectrometer (TOF-SIMS) with respect to a surface 40 of the coat layer in contact with the air and to an inside portion 50 of the coat layer which was located inside the film (at ½ of the film thickness, a surface exposed at the inside of the coat layer in contact with the substrate 10).
Evaluation The evaluation was made using the equation described below. The ion concentrations at the respective measurement points were relative intensities (relative to the total of the detected ions).

Gradient Sa/Da (ratio of sulfonate concentrations, gradient)=Sulfonate concentration at surface 40 of coat layer/Sulfonate concentration at ½ of film thickness of coat layer 20

(Measurement of Film Thickness)
(Measurement Apparatus and Conditions)

Apparatus: Field emission transmission electron microscope (FE-TEM): JEM-2200FS (manufactured by JEOL Ltd.)

Accelerating voltage: 200 kV

FIB (focused ion beam system) processing unit: SMI2050 (manufactured by Seiko Instruments Inc.)

Preparation and Analysis of Sample

A central portion of the convex surface of a sample was cut out. Onto the outermost surface of the sample, a Pt coat was formed and carbon was deposited. The sample was then processed by FIB processing into a thin specimen. The specimen was observed with the field emission transmission electron microscope (FE-TEM) to determine the thickness of the film.

[Synthetic Example 1] <Production of Copolymer 90/5/5 CH140212>

A reaction flask was loaded with 483.3 g of methanol that had been degassed under reduced pressure. While performing stirring, 28.0 g (0.424 mol) of 85 wt %-purity KOH flakes were gradually added and were dissolved completely. Next, 89.9 g (0.424 mol) of acrylamido-t-butylsulfonic acid (hereinafter, written as ATBS) was added in portions to neutralize the mixture (pH=7.2). Thus, a neutral mixture containing potassium acrylamido-t-butylsulfonate salt (hereinafter, written as ATBS-K) was prepared.

Next, a mixture liquid was prepared which contained 7.54 g (0.0530 mol) of glycidyl methacrylate (hereinafter, written as GMA), 15.40 g (0.0530 mol) of methacryloyloxypropyltriethoxysilane (hereinafter, written as KBE-503) and 22.8 g of methanol. Separately, a mixture liquid was prepared which contained 1.15 g of t-butyl peroxy-2-ethylhexanoate (hereinafter, written as perbutyl-O) as a polymerization initiator and 11.5 g of methanol. Over a period of 2 hours, these mixture liquids were added each in three portions into the reaction flask in which the neutral mixture had been heated under reflux (internal temperature 66° C.). After the completion of the addition, the polymerization was performed for 8 hours while performing heating under reflux and while performing stirring.

After being cooled to room temperature, the mixture was filtered to recover the copolymer that had been precipitated. The filtered residue was washed with 300 ml of methanol twice, and was sufficiently dried under reduced pressure (below 100 mmHg) at 50° C. until a constant weight was reached. In this manner, 86.0 g of a white copolymer was obtained (yield 67%).

From the GPC analysis of the copolymer, the weight average molecular weight Mw was 108,000 and the molecular weight distribution Mw/Mn was 3.4. Further, $^{13}$C-NMR analysis showed that the ratio of the structural units in the copolymer, ATBS-K units/GMA units/KBE-503 units, was 90/5/5. The analysis did not detect any units resulting from the ring opening of an epoxy group. The results are described in Table 1.

[Chem. 31]

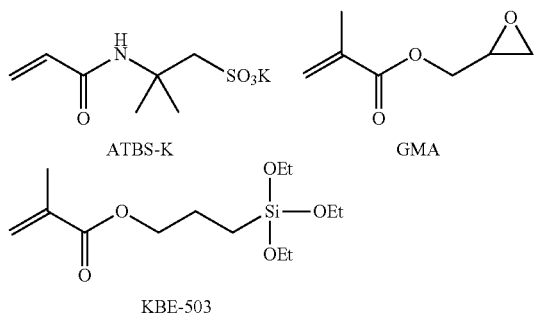

[Synthetic Example 2] <Production of Copolymer 91/9/0 CH140225>

A copolymer was prepared in the same manner as in Synthetic Example 1, except that 7.54 g (0.0530 mol) of GMA and 15.40 g (0.0530 mol) of KBE-503 were replaced by 5.48 g (0.0386 mol) of GMA alone. As a result, 108.8 g of a white copolymer was obtained (yield 97%). From the GPC analysis of the copolymer, the weight average molecular weight Mw was 90,000 and the molecular weight distribution Mw/Mn was 3.1. Further, $^{13}$C-NMR analysis showed that the ratio of the structural units in the copolymer, ATBS-K units/GMA units/KBE-503 units, was 91/9/0. The analysis did not detect any units resulting from the ring opening of an epoxy group. The results are described in Table 1.

[Synthetic Example 3] <Production of Copolymer 90/0/10 CH140206>

A copolymer was prepared in the same manner as in Synthetic Example 1, except that 7.54 g (0.0530 mol) of GMA and 15.40 g (0.0530 mol) of KBE-503 were replaced by 30.8 g (0.1061 mol) of KBE-503. As a result, 84.7 g of a white copolymer was obtained (yield 62%). From the GPC analysis of the copolymer, the weight average molecular weight Mw was 76,000 and the molecular weight distribution Mw/Mn was 2.7. Further, $^{13}$C-NMR analysis showed that the ratio of the structural units in the copolymer, ATBS-K units/GMA units/KBE-503 units, was 90/0/10. The results are described in Table 1.

TABLE 1

| | Polymer structures | | | | | | |
| --- | --- | --- | --- | --- | --- | --- | --- |
| | | | | Unit ratio (by mol) | | | |
| No. | Appearance | Mw | Mw/Mn | ATBS-K | GMA | KBE-503 | Remarks |
| Syn. Ex. 1 | White solid | 108,000 | 3.4 | 90 | 5 | 5 | CH140212 |
| Syn. Ex. 2 | White solid | 90,000 | 3.1 | 91 | 9 | — | CH140225 |

TABLE 1-continued
| | | | | Polymer structures | | | |
| | | | | | Unit ratio (by mol) | | |
| No. | Appearance | Mw | Mw/Mn | ATBS-K | GMA | KBE-503 | Remarks |
| Syn. Ex. 3 | White solid | 76,000 | 2.7 | 90 | — | 10 | CH140206 |
[Chem. 32]
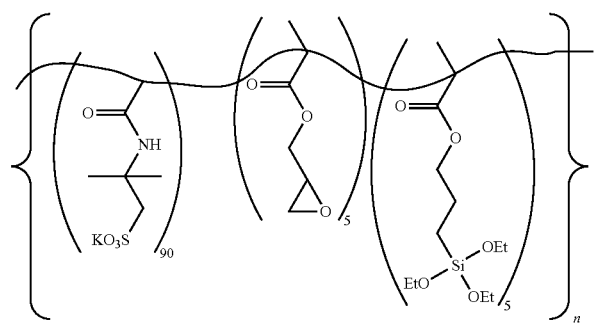
Copolymer of Synthetic Example 1
CH140212 Mw = 108,000
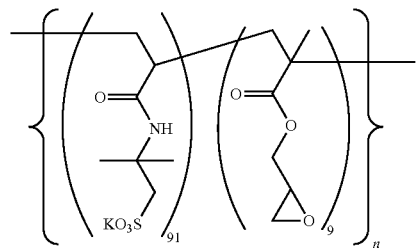
Copolymer of Synthetic Example 2
CH140225 Mw = 90,000
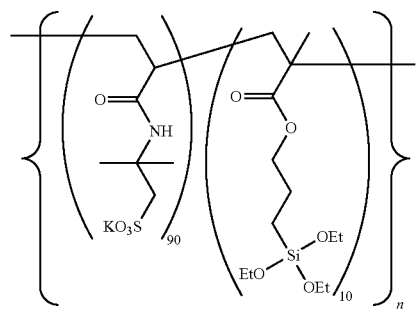
Copolymer of Synthetic Example 3
CH140206 Mw = 76,000

Example 1

(Preparation of Coating Solution 1 with Formulation 1>

Components were mixed together in the sequence described in Table 2 below. Lastly, the mixture was passed through a filter having an average pore size of 0.5 μm. A coating solution 1 was thus prepared.

TABLE 2

Formulation 1: Formulation of coating solution 1

| Sequence of addition | Components | Amounts (g) | Weight proportions of 3 components and surfactant (as 100%) | Remarks |
|---|---|---|---|---|
| 1 | Copolymer of Synthetic Example 1 | 3.2 | 50 | |
| 2 | Water | 11.9 | | |
| 3 | EG: ethylene glycol | 11.9 | | |
| 4 | EGM: 2-methoxyethanol | 59.4 | | |
| 5 | 30 wt % silica sol in methanol (NISSAN CHEMICAL INDUSTRIES, LTD.) | 6.4 | 30 | |
| 6 | 60 wt % aqueous methylated melamine resin* solution | 2.1 | 20 | |
| 7 | 5 wt % aqueous vinylsulfonic acid solution | 5.0 | | Catalyst |
| 8 | 10 wt % DS-Na solution in water-EGM | 0.05 | 0.08 | Surfactant |
| Total | | 99.95 | Solid content: 6.6 wt % | |

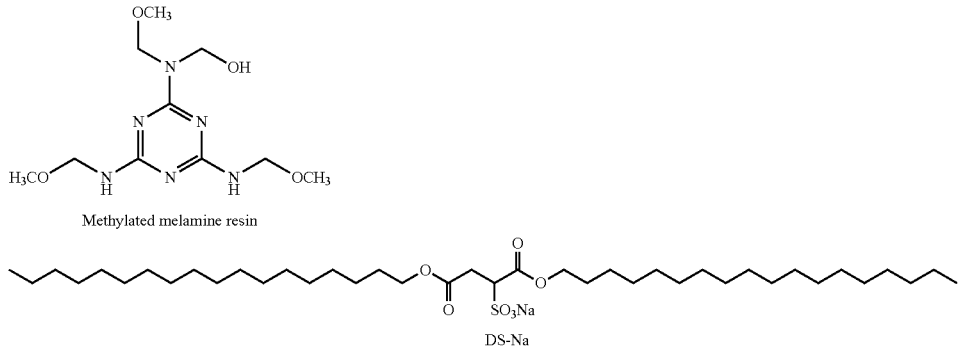

Methylated melamine resin

DS-Na (Preparation of Primer Composition)

While performing stirring, 94.5 g of 2-methoxyethanol (hereinafter, written as EGM) and 5.0 g of water were admixed with 0.5 g of bis(trimethoxysilylpropyl)amine (hereinafter, written as KBM-666P) as a silane coupling agent to give a primer composition having a solid content of 0.5 wt %.

(Formation of Primer Layer)

A thoroughly cleaned glass plate (water contact angle on surface: less than 8°) as a substrate was set on a spin coater (MIKASA SPINCOATER 1H-DX2). While rotating the substrate at a rotational speed of 500 rpm, the primer composition (solid content: 0.5 wt %) was dropped. After 5 seconds after the dropping, the rotational speed was increased to 4000 rpm, and the substrate was rotated at the rotational speed for 10 seconds, thereby spreading the primer composition uniformly over the surface of the substrate. The coated substrate obtained was preliminarily dried in an oven at 50° C. for 1 minute and was thereafter heated in an oven at 120° C. for 1 hour. In this manner, a primer-treated substrate was obtained in which a 5 nm thick layer of the silane coupling agent was disposed on the substrate.

(Formation of Coating Film)

With a bar coater #30, the coating liquid 1 was applied onto the primer layer of the primer-treated substrate. The coated substrate was preliminarily dried in an oven at 50° C. for 1 minute and was thereafter heated at 120° C. for 2 hours, thereby forming a 3 μm thick coating film on the primer layer.

In the manner described above, a stack was obtained in which the primer layer and the coating film (the total thickness of the two layers: 3.005 μm) were disposed on the substrate (the glass plate). The stack was cooled to room temperature. The coating film was washed under running water while rubbing the surface with BEMCOT M-3 II (Asahi Kasei Corporation Fibers & Textiles SBU), and the surface of the film was dried with an air gun. Thereafter, the properties of the coating film (appearance, fouling by heating at 120° C., pencil hardness, antifogging properties, antifouling properties, adhesion and Taber abrasion resistance) were evaluated by the aforementioned methods. The results are described in Table 3.

Reference Example 1

A stack was obtained in which a coating film was formed on a primer layer disposed on a substrate (a glass plate) by repeating the procedures in the preparation of coating solution 1, the preparation of primer composition, the formation of primer layer and the formation of coating film in Example 1, except that the copolymer of Synthetic Example 1 was replaced by the copolymer of Synthetic Example 2. Similarly to Example 1, the properties of the coating film obtained were evaluated by the aforementioned methods. The results are described in Table 3.

Example 2

The procedures in the preparation of coating solution 1, the preparation of primer composition, the formation of primer layer and the formation of coating film in Example 1 were repeated, except that the substrate on which the primer layer was formed was changed to a polycarbonate plate (hereinafter, written as the PC plate). Consequently, a stack was obtained in which a coating film was formed on a primer layer disposed on the substrate (the PC plate). Similarly to Example 1, the properties of the coating film obtained were evaluated by the aforementioned methods. The results are described in Table 3.

Reference Example 2

The procedures in the preparation of coating solution 1, the preparation of primer composition, the formation of primer layer and the formation of coating film in Reference Example 1 were repeated, except that the substrate on which the primer layer was formed was changed to a PC plate. Consequently, a stack was obtained in which a coating film was formed on a primer layer disposed on the substrate (the PC plate). Similarly to Example 1, the properties of the coating film obtained were evaluated by the aforementioned methods. The results are described in Table 3.

Comparative Example 1

(Production of Polymer CH110901>

A reaction flask was loaded with 535.5 g of methanol that had been degassed under reduced pressure. While performing stirring, 23.6 g (0.357 mol) of 85 wt %-purity KOH flakes were gradually added and were dissolved completely. Next, 75.7 g (0.357 mol) of ATBS was added in portions to neutralize the mixture (pH=7.5). Thus, a neutral mixture containing ATBS-K was prepared.

Next, a mixture liquid which contained 5.14 g (0.036 mol) of GMA and 0.13 g of perbutyl-O as a polymerization initiator was added to the neutral mixture while performing heating under reflux (internal temperature 63° C.). The polymerization was performed for 4.5 hours while performing heating under reflux and while performing stirring.

After being cooled to room temperature, the mixture was filtered to recover the polymer that had been precipitated. The filtered residue was washed with methanol and was dried under reduced pressure (below 100 mmHg) at 50° C. until a constant weight was reached. In this manner, 88.8 g of a white copolymer "CH110901" was obtained (yield 94%).

From the GPC analysis of the copolymer, the weight average molecular weight Mw was 163,000 and the molecular weight distribution Mw/Mn was 3.4. Further, $^{13}$C-NMR analysis showed that the ratio of the structural units in the copolymer, ATBS-K units/GMA units, was 87/13. The analysis did not detect any units resulting from the ring opening of an epoxy group.

(Preparation of Coating Composition 1>

A solution was prepared by admixing 40 g of water to 5.8 g of the copolymer produced (the polymer CH110901). While performing stirring, 35 g of 2-methoxyethanol (hereinafter, written as EGM), 20.1 g of tetraethoxysilane (hereinafter, written as TEOS) and 6 g of a 5 wt % aqueous sulfuric acid solution were admixed to the solution. The resultant mixture liquid was passed through a filter having an average pore size of 0.5 μm. Thus, 106.9 g of a colorless and transparent coating composition 1 was obtained which had a solid content (the total content of the copolymer and TEOS in terms of $SiO_2$) of 11 wt %. In the composition, the polymer/TEOS (in terms of $SiO_2$) weight ratio was 50/50.

(Application Test)

A stack was obtained in which a coating film was formed on a primer layer disposed on a substrate (a glass plate) by repeating the procedures in the preparation of primer composition, the formation of primer layer and the formation of coating film in Example 1, except that the application of the coating solution 1 onto the substrate with a bar coater #30 was changed to the application of the coating composition 1 onto the substrate with a bar coater #18. Similarly to Example 1, the properties of the coating film obtained were evaluated by the aforementioned methods. The results are described in Table 3.

TABLE 3

Results of application test of coating solution 1 having formulation 1

| No. | Copolymer | Substrate | Appearance | Water contact angle (°) Before heating | Water contact angle (°) 120° C. × 12 h | Haze (%) Before heating | Haze (%) 120° C. × 12 h | Pencil hardness | Anti-fogging properties | Anti-fouling properties | Adhesion | Taber abrasion resistance (Haze) Before test | Taber abrasion resistance (Haze) After 50 rotations | Remarks |
|---|---|---|---|---|---|---|---|---|---|---|---|---|---|---|
| Ex. 1 | Syn. Ex. 1 90/5/5 | Glass | Transparent | 9 | 11 | 0.2 | 0.2 | 3H | ○ | ○ | 100/100 | 0.1 | 19.1 | |
| Ref. Ex. 1 | Syn. Ex. 2 91/9/0 | Glass | Transparent | 7 | 9 | 0.2 | 0.3 | 3H | ○ | ○ | 100/100 | 0.5 | 18.6 | |
| Ex. 2 | Syn. Ex. 1 90/5/5 | PC | Transparent | 6 | 8 | 0.2 | 0.9 | B | ○ | ○ | 100/100 | — | — | |

TABLE 3-continued

Results of application test of coating solution 1 having formulation 1

| No. | Copolymer | Substrate | Appearance | Water contact angle (°) Before heating | Water contact angle (°) 120° C. × 12 h | Haze (%) Before heating | Haze (%) 120° C. × 12 h | Pencil hardness | Anti-fogging properties | Anti-fouling properties | Adhesion | Taber abrasion resistance (Haze) Before test | Taber abrasion resistance (Haze) After 50 rotations | Remarks |
|---|---|---|---|---|---|---|---|---|---|---|---|---|---|---|
| Ref. Ex. 2 | Syn. Ex. 2 91/9/0 | PC | Transparent | 6 | 8 | 0.4 | 1.3 | 2B | ○ | ○ | 100/100 | — | — | |
| Comp Ex. 1 | CH110901 97/13/0 | Glass | Transparent | 4 | 36 | 0.2 | 0.3 | — | ○ | ○ | 100/100 | 0.3 | 25.4 | TEOS added |

[Chem. 34]

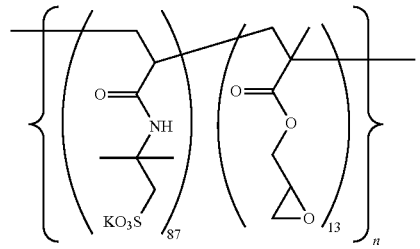

Copolymer of Comparative Example 1
CH110901 Mw = 163,000

Example 3

Components were mixed together in the sequence described in Table 4 below (Formulation 2). Lastly, the mixture was passed through a filter having an average pore size of 0.5 μm. A coating solution 2 was thus prepared.

A stack was obtained in which a coating film was formed on a primer layer disposed on a substrate (a glass plate) by repeating the procedures in the preparation of primer composition, the formation of primer layer and the formation of coating film, except that the coating solution 1 was replaced by the coating solution 2. The properties of the coating film obtained (appearance, water contact angle, haze, antifouling properties, adhesion, pencil hardness and Taber abrasion resistance) were evaluated by the aforementioned methods. The results are described in Table 5. The gradient in the coating film was measured with the TOF-SIMS, the results being described in Table 6.

TABLE 4

Formulation 2; Formulation of coating solution 2

| Sequence of addition | Components | Amounts (g) | Weight proportions of 3 components and surfactant (as 100%) | Remarks |
|---|---|---|---|---|
| 1 | Copolymer of Synthetic Example 1 | 1.2 | 20 | |
| 2 | Water | 11.5 | | |
| 3 | EG: ethylene glycol | 11.5 | | |
| 4 | EGM: 2-methoxyethanol | 57.6 | | |
| 5 | 30 wt % silica sol in methanol (NISSAN CHEMICAL INDUSTRIES, LTD.) | 10.2 | 50 | |
| 6 | 60 wt % aqueous methylated melamine resin* solution | 3.1 | 30 | |
| 7 | 5 wt % aqueous vinylsulfonic acid solution | 4.8 | | Catalyst |
| 8 | 10 wt % DS-Na solution in water-EGM | 0.05 | 0.08 | Surfactant |
| Total | | 99.95 | Solid content: 6.4 wt % | |

Reference Example 3

A stack was obtained in which a coating film was formed on a primer layer disposed on a substrate (a glass plate) by repeating the procedures in the preparation of coating solution 2, the preparation of primer composition, the formation of primer layer and the formation of coating film in Example 3, except that the copolymer of Synthetic Example 1 was replaced by the copolymer of Synthetic Example 2. Similarly to Example 3, the properties of the coating film obtained were evaluated by the aforementioned methods. The results are described in Table 5.

Reference Example 4

A stack was obtained in which a coating film was formed on a primer layer disposed on a substrate (a glass plate) by repeating the procedures in the preparation of coating solution 2, the preparation of primer composition, the formation of primer layer and the formation of coating film in Example 3, except that the copolymer of Synthetic Example 1 was replaced by the copolymer of Synthetic Example 3 and the amount of the 10 wt % DS-Na solution in water-EGM (surfactant) was changed from 0.05 g to 0.5 g (increased 10 times). Similarly to Example 3, the properties of the coating film obtained were evaluated by the aforementioned methods. The results are described in Table 5.

Comparative Example 2

(Preparation of Coating Composition 2>

A solution was prepared by admixing 30 g of water to 2.3 g of the copolymer produced in Comparative Example 1 (the polymer CH110901). While performing stirring, 35 g of EGM, 32.1 g of TEOS and 6 g of a 5 wt % aqueous sulfuric acid solution were admixed to the solution. The resultant mixture liquid was passed through a filter having an average pore size of 0.5 μm. Thus, 105.4 g of a colorless and transparent coating composition 2 was obtained which had a solid content (the total content of the copolymer and TEOS in terms of $SiO_2$) of 11 wt %. In the composition, the polymer/TEOS (in terms of $SiO_2$) weight ratio was 20/80.

(Application Test)

A stack was obtained in which a coating film was formed on a primer layer disposed on a substrate (a glass plate) by repeating the procedures in the preparation of primer composition, the formation of primer layer and the formation of coating film in Example 5, except that the application of the coating solution 2 onto the substrate with a bar coater #30 was changed to the application of the coating composition 2 onto the substrate with a bar coater #18. Similarly to Example 5, the properties of the coating film obtained were evaluated by the aforementioned methods. The results are described in Table 5.

TABLE 5

Results of application test of coating solution 2 having formulation 2

| No. | Copolymer | Substrate | Appearance | Water contact angle (°) | Haze (%) | Antifouling properties | Adhesion | Pencil hardness | Taber abrasion resistance (Haze) Before test | | Remarks |
|---|---|---|---|---|---|---|---|---|---|---|---|
| Ex. 3 | Syn. Ex. 1 90/5/5 | Glass | Transparent | 14 | 0.2 | ○ | 100/100 | 6H | 0.2 | 5.3 | |
| Ref. Ex. 3 | Syn. Ex. 2 91/9/0 | Glass | Transparent | 5 | 0.3 | ○ | 100/100 | 6H | 0.3 | 5.3 | |
| Ref. Ex. 4 | Syn. Ex. 3 90/0/10 | Glass | Transparent | 16 | 1.9 | ○ | 100/100 | — | — | — | |
| Comp. Ex. 2 | CH110901 87/13/0 | Glass | Transparent | 14 | 0.2 | ○ | 100/100 | — | 0.2 | 7.1 | TEOS added |

TABLE 6

Analysis of film of Example 3 in thickness direction

| | *Surface concentration Sa | **Deep concentration Da | Gradient Sa/Da |
|---|---|---|---|
| 1)Sulfonate components | 9.7E−02 | 8.6E−02 | 1.13 |
| 2)Melamine resin components | 9.9E−02 | 11.0E−02 | 0.90 |
| 3)Silica particle components | 0.66E−02 | 2.1E−02 | 0.31 |

*Ion intensity at surface of hydrophilic film measured by TOF-SIMS analysis
**Ion intensity at ½ film thickness of hydrophilic film measured by TOF-SIMS analysis
1)Intensity of sulfonate ($SO_3^-$) measured by TOF-SIMS
2)Intesnsity of amino groups ($C_2N_3^-$) measured by TOF-SIMS
3)Intensity of silica particles ($Si^+$) measured by TOF-SIMS

[Synthetic Example 4] <Production of Copolymer 94/3/3 AFM0110>

A reaction flask was loaded with 756.6 g of methanol that had been degassed under reduced pressure. While performing stirring, 50.46 g (0.7645 mol) of 85 wt %-purity KOH flakes were gradually added and were dissolved completely. Next, 162.0 g (0.7645 mol) of acrylamido-t-butylsulfonic acid (hereinafter, written as ATBS) was added in portions to neutralize the mixture (pH=7.6). Thus, a neutral mixture containing ATBS-K was prepared.

Next, a mixture liquid which contained 3.47 g (0.0244 mol) of GMA, 7.09 g (0.0244 mol) of KBE-503 and 10.0 g of methanol, and a mixture liquid which contained 0.53 g of perbutyl-O as a polymerization initiator and 5.0 g of methanol were prepared separately. Over a period of 2 hours, these mixture liquids were added each in three portions into the reaction flask in which the neutral mixture had been heated under reflux (internal temperature 66° C.). After the completion of the addition, the polymerization was performed for 5 hours while performing heating under reflux and while performing stirring.

After being cooled to room temperature, the mixture was filtered to recover the copolymer that had been precipitated. The filtered residue was washed with 300 ml of methanol twice, and was sufficiently dried under reduced pressure (below 100 mmHg) at 50° C. until a constant weight was reached. In this manner, 198.0 g of a white copolymer was obtained (yield 97%).

From the GPC analysis of the copolymer, the weight average molecular weight Mw was 105,000 and the molecular weight distribution Mw/Mn was 4.1. Further, $^{13}$C-NMR analysis showed that the ratio of the structural units in the copolymer, ATBS-K units/GMA units/KBE-503 units, was 94/3/3. The analysis did not detect any units resulting from the ring opening of an epoxy group. The results are described in Table 7.

[Synthetic Example 5] <Production of Copolymer 71/17/12 CH131218>

A reaction flask was loaded with 322.5 g of methanol and 118.6 g of ethanol which had both been degassed under reduced pressure. While performing stirring, 15.00 g (0.2273 mol) of 85 wt %-purity KOH flakes were gradually added and were dissolved completely. Next, 48.16 g (0.2273 mol) of acrylamido-t-butylsulfonic acid (hereinafter, written as ATBS) was added in portions to neutralize the mixture (pH=7.4). Thus, a neutral mixture containing ATBS-K was prepared.

Next, a mixture liquid which contained 16.15 g (0.1136 mol) of GMA, 33.00 g (0.1136 mol) of KBE-503 and 22.8 g of degassed ethanol, and a mixture liquid which contained 0.98 g of perbutyl-O as a polymerization initiator and 9.8 g of degassed ethanol were prepared separately. Over a period of 2 hours, these mixture liquids were added each in three portions into the reaction flask in which the neutral mixture had been heated under reflux (internal temperature 67° C.). After the completion of the addition, the polymerization was performed for 8 hours while performing heating under reflux and while performing stirring.

After being cooled to room temperature, the mixture was filtered to recover the copolymer that had been precipitated. The filtered residue was washed with 500 ml of methanol, and was sufficiently dried under reduced pressure (below 100 mmHg) at 50° C. until a constant weight was reached. In this manner, 53.3 g of a white copolymer was obtained (yield 50%).

From the GPC analysis of the copolymer, the weight average molecular weight Mw was 38,000 and the molecular weight distribution Mw/Mn was 3.9. Further, $^{13}$C-NMR analysis showed that the ratio of the structural units in the copolymer, ATBS-K units/GMA units/KBE-503 units, was 71/17/12. The analysis did not detect any units resulting from the ring opening of an epoxy group. The results are described in Table 7.

[Synthetic Example 6] <Production of Copolymer 66/20/14 CH131216>

A reaction flask was loaded with 347.9 g of methanol and 173.9 g of ethanol which had both been degassed under reduced pressure. While performing stirring, 15.00 g (0.2273 mol) of 85 wt %-purity KOH flakes were gradually added and were dissolved completely. Next, 48.40 g (0.2284 mol) of acrylamido-t-butylsulfonic acid (hereinafter, written as ATBS) was added in portions to neutralize the mixture (pH=7.4). Thus, a neutral mixture containing ATBS-K was prepared.

Next, a mixture liquid which contained 24.23 g (0.1705 mol) of GMA, 49.50 g (0.1705 mol) of KBE-503 and 2.0 g of degassed ethanol, and a mixture liquid which contained 1.23 g of perbutyl-O as a polymerization initiator and 12.3 g of degassed ethanol were prepared separately. Over a period of 2 hours, these mixture liquids were added each in three portions into the reaction flask in which the neutral mixture had been heated under reflux (internal temperature 67° C.). After the completion of the addition, the polymerization was performed for 8 hours while performing heating under reflux and while performing stirring.

After being cooled to room temperature, the mixture was filtered to recover the copolymer that had been precipitated. The filtered residue was washed with 500 ml of methanol, and was sufficiently dried under reduced pressure (below 100 mmHg) at 50° C. until a constant weight was reached. In this manner, 53.2 g of a white copolymer was obtained (yield 41%).

From the GPC analysis of the copolymer, the weight average molecular weight Mw was 38,000 and the molecular weight distribution Mw/Mn was 2.7. Further, $^{13}$C-NMR analysis showed that the ratio of the structural units in the copolymer, ATBS-K units/GMA units/KBE-503 units, was 66/20/14. The analysis did not detect any units resulting from the ring opening of an epoxy group. The results are described in Table 7.

TABLE 7

| | | Polymer structures | | | | | |
|---|---|---|---|---|---|---|---|
| | | | | Unit ratio | | | |
| No. | Appearance | Mw | Mw/Mn | ATBS-K | GMA | KBE-503 | Remarks |
| Syn. Ex. 4 | White solid | 105,000 | 4.1 | 94 | 3 | 3 | AFM0110 |
| Syn. Ex. 1 | White solid | 108,000 | 3.4 | 90 | 5 | 5 | CH140212 |
| Syn. Ex. 5 | White solid | 78,000 | 3.9 | 71 | 17 | 12 | CH131218 |
| Syn. Ex. 6 | White solid | 38,000 | 2.7 | 66 | 20 | 14 | CH131216 |

Example 4 and Reference Examples 5 and 6

A stack was obtained in which a coating film was formed on a primer layer disposed on a substrate (a glass plate) by repeating the procedures in the preparation of coating solution 1, the preparation of primer composition, the formation of primer layer and the formation of coating film in Example 1, except that the copolymer of Synthetic Example 1 was replaced by any of the copolymers described in Table 8 below. The properties of the coating film obtained (appearance, fouling by heating at 120° C., pencil hardness, antifogging properties, antifouling properties and adhesion) were evaluated by the aforementioned methods. The results are described in Table 8. Table 8 also describes the results of Example 1.

Example 5 and Reference Examples 7 and 8

A stack was obtained in which a coating film was formed on a primer layer disposed on a substrate (a PC plate) by repeating the procedures in the preparation of coating solution 1, the preparation of primer composition, the formation of primer layer and the formation of coating film in Example 2, except that the copolymer of Synthetic Example 1 was replaced by any of the copolymers described in Table 8 below. The properties of the coating film obtained (appearance, fouling by heating at 120° C., pencil hardness, antifogging properties, antifouling properties and adhesion) were evaluated by the aforementioned methods. The results are described in Table 8. Table 8 also describes the results of Example 2.

TABLE 8

Results of application test with formulation 1

| No. | Copolymer | Substrate | Appearance | Water contact angle Before heating | Water contact angle 120° C. × 12 h | Haze Before heating | Haze 120° C. × 12 h | Pencil hardness | Antifogging properties | Antifouling properties | Adhesion |
|---|---|---|---|---|---|---|---|---|---|---|---|
| Ex. 4 | Syn. Ex. 4 94/3/3 | Glass | Transparent | 8 | 12 | 0.2 | 0.3 | 2H | ○ | ○ | 100/100 |
| Ex. 1 | Syn. Ex. 1 90/5/5 | Glass | Transparent | 9 | 11 | 0.2 | 0.2 | 3H | ○ | ○ | 100/100 |
| Ref. Ex. 5 | Syn. Ex. 5 71/17/12 | Glass | Transparent | 66 | 73 | 0.2 | 0.2 | 6H | x | Δ | 100/100 |
| Ref. Ex. 6 | Syn. Ex. 6 66/20/14 | Glass | Transparent | 70 | 73 | 0.2 | 0.2 | 7H | x | Δ | 100/100 |
| Ex. 5 | Syn. Ex. 4 94/3/3 | PC | Transparent | 6 | 7 | 0.2 | 0.9 | 2B | ○ | ○ | 100/100 |
| Ex. 2 | Syn. Ex. 1 90/5/5 | PC | Transparent | 6 | 8 | 0.2 | 0.9 | B | ○ | ○ | 100/100 |
| Ref. Ex. 7 | Syn. Ex. 5 71/17/12 | PC | Transparent | 52 | 57 | 0.2 | 0.4 | B | x | x | 100/100 |
| Ref. Ex. 8 | Syn. Ex. 6 66/20/14 | PC | Transparent | 60 | 67 | 0.2 | 0.3 | HB | x | x | 100/100 |

[Synthetic Example 7] <Production of Copolymer 86/5/9 CH130115>

A reaction flask was loaded with 1150.0 g of methanol that had been degassed under reduced pressure. While performing stirring, 28.0 g (0.424 mol) of 85 wt %-purity KOH flakes were gradually added and were dissolved completely. Next, 89.9 g (0.424 mol) of ATBS was added in portions to neutralize the mixture (pH=7.3). Thus, a neutral mixture containing ATBS-K was prepared.

Next, a mixture liquid which contained 3.77 g (0.0265 mol) of GMA, 23.10 g (0.0795 mol) of KBE-503 and 3.1 g of methanol, and a mixture liquid which contained 3.44 g of perbutyl-O as a polymerization initiator and 11.5 g of methanol were prepared separately. Over a period of 2 hours, these mixture liquids were added each in three portions into the reaction flask in which the neutral mixture had been heated under reflux (internal temperature 66° C.). After the completion of the addition, the polymerization was performed for 8 hours while performing heating under reflux and while performing stirring.

After being cooled to room temperature, the mixture was filtered to recover the copolymer that had been precipitated. The filtered residue was washed with 700 ml of methanol, and was sufficiently dried under reduced pressure (below 100 mmHg) at 50° C. until a constant weight was reached. In this manner, 69.2 g of a white copolymer was obtained (yield 52%).

From the GPC analysis of the copolymer, the weight average molecular weight Mw was 68,000 and the molecular weight distribution Mw/Mn was 2.5. Further, $^{13}$C-NMR analysis showed that the ratio of the structural units in the copolymer, ATBS-K units/GMA units/KBE-503 units, was 86/5/9. The analysis did not detect any units resulting from the ring opening of an epoxy group. The results are described in Table 9.

[Synthetic Example 8] <Production of Copolymer 82/14/4 CH130117>

A copolymer was prepared in the same manner as in Synthetic Example 7, except that GMA and KBE-503 were used in 11.31 g (0.0795 mol) and 7.7 g (0.0265 mol), respectively. As a result, 92.2 g of a white copolymer was obtained (yield 73%). From the GPC analysis of the copolymer, the weight average molecular weight Mw was 71,000 and the molecular weight distribution Mw/Mn was 2.5. Further, $^{13}$C-NMR analysis showed that the ratio of the structural units in the copolymer, ATBS-K units/GMA units/KBE-503 units, was 82/14/4. The analysis did not detect any units resulting from the ring opening of an epoxy group.

The results are described in Table 9.

TABLE 9

| No. | Appearance | Mw | Mw/Mn | Unit ratio (by mol) ATBS-K | Unit ratio (by mol) GMA | Unit ratio (by mol) KBE-503 | Remarks |
|---|---|---|---|---|---|---|---|
| Syn. Ex. 7 | White solid | 68,000 | 2.5 | 86 | 5 | 9 | CH130115 |
| Syn. Ex. 1 | White solid | 108,000 | 3.4 | 90 | 5 | 5 | CH140212 |
| Syn. Ex. 8 | White solid | 71,000 | 2.5 | 82 | 14 | 4 | CH130117 |

Examples 6 and 7

A stack was obtained in which a coating film was formed on a primer layer disposed on a substrate (a glass plate) by repeating the procedures in the preparation of coating solution 1, the preparation of primer composition, the formation of primer layer and the formation of coating film in Example 1, except that the copolymer of Synthetic Example 1 was replaced by any of the copolymers described in Table 10 below. The properties of the coating film obtained (appearance, fouling by heating at 120° C., pencil hardness, antifogging properties and antifouling properties) were evaluated by the aforementioned methods. The results are described in Table 10. Table 10 also describes the results of Example 1.

Examples 8 and 9

A stack was obtained in which a coating film was formed on a primer layer disposed on a substrate (a glass plate) by repeating the procedures in the preparation of coating solution 2, the preparation of primer composition, the formation of primer layer and the formation of coating film in Example 3, except that the copolymer of Synthetic Example 1 was replaced by any of the copolymers described in Table 10 below. The properties of the coating film obtained (appearance, fouling by heating at 120° C., pencil hardness, antifogging properties and antifouling properties) were evaluated by the aforementioned methods. The results are described in Table 10. Table 10 also describes the results of Example 3.

[Synthetic Example 10] <Production of Copolymer 59/41/0 CH140312>

A reaction flask was loaded with 215.0 g of methanol and 215.0 g of ethanol which had both been degassed under reduced pressure. While performing stirring, 20.0 g (0.303 mol) of 85 wt %-purity KOH flakes were gradually added and were dissolved completely. Next, 64.2 g (0.303 mol) of ATBS was added in portions to neutralize the mixture (pH=7.4). Thus, a neutral mixture containing ATBS-K was prepared.

TABLE 10

GMA units/KBM-503 units ratio

| No. | Copolymer | Appearance | Water contact angle (°) Before heating | Water contact angle (°) 120° C. × 12 h | Haze (%) Before heating | Haze (%) 120° C. × 12 h | Pencil hardness | Antifogging properties | Antifouling properties | Coating solution |
|---|---|---|---|---|---|---|---|---|---|---|
| Ex. 6 | Syn. Ex. 7 86/5/9 | Transparent | 9 | 9 | 0.1 | 0.1 | 3H | ○ | ○ | Coating solution 1 with formulation 1 |
| Ex. 1 | Syn. Ex. 1 90/5/5 | Transparent | 9 | 11 | 0.2 | 0.2 | 3H | ○ | ○ | Same as above |
| Ex. 7 | Syn. Ex. 8 82/14/4 | Transparent | 9 | 10 | 0.3 | 0.3 | 3H | ○ | ○ | Same as above |
| Ex. 8 | Syn. Ex. 7 86/5/9 | Transparent | 14 | 12 | 0.2 | 0.2 | 5H | Δ | ○ | Coating solution 2 with formulation 2 |
| Ex. 3 | Syn. Ex. 1 90/5/5 | Transparent | 14 | 10 | 0.2 | 0.3 | 6H | Δ | ○ | Same as above |
| Ex. 9 | Syn. Ex. 8 82/14/4 | Transparent | 20 | 18 | 0.4 | 0.6 | 6H | Δ | ○ | Same as above |

[Synthetic Example 9] <Production of Copolymer 95/5/0 CH120217>

A reaction flask was loaded with 780.0 g of methanol that had been degassed under reduced pressure. While performing stirring, 46.26 g (0.7009 mol) of 85 wt %-purity KOH flakes were gradually added and were dissolved completely. Next, 150.0 g (0.7078 mol) of ATBS was added in portions to neutralize the mixture (pH=7.7). Thus, a neutral mixture containing ATBS-K was prepared.

Next, a mixture liquid which contained 3.43 g (0.0236 mol) of GMA and 2.0 g of methanol, and a mixture liquid which contained 0.24 g of perbutyl-O as a polymerization initiator and 2.4 g of methanol were prepared separately. Over a period of 2 hours, these mixture liquids were added each in three portions into the reaction flask in which the neutral mixture had been heated under reflux (internal temperature 68° C.). After the completion of the addition, the polymerization was performed for 6 hours while performing heating under reflux and while performing stirring.

After being cooled to room temperature, the mixture was filtered to recover the copolymer that had been precipitated. The filtered residue was washed with 400 ml of methanol twice, and was sufficiently dried under reduced pressure (below 100 mmHg) at 50° C. until a constant weight was reached. In this manner, 174.7 g of a white copolymer was obtained (yield 97%).

From the GPC analysis of the copolymer, the weight average molecular weight Mw was 107,000 and the molecular weight distribution Mw/Mn was 3.0. Further, $^{13}$C-NMR analysis showed that the ratio of the structural units in the copolymer, ATBS-K units/GMA units/KBE-503 units, was 95/5/0. The analysis did not detect any units resulting from the ring opening of an epoxy group. The results are described in Table 11.

Next, a mixture liquid which contained 23.2 g (0.163 mol) of GMA, 0.15 g of perbutyl-O as a polymerization initiator and 46.7 g of degassed ethanol was prepared. Over a period of 2 hours, the mixture liquid was added in three portions into the reaction flask in which the neutral mixture had been heated under reflux (internal temperature 68° C.). After the completion of the addition, the polymerization was performed for 10 hours while performing heating under reflux and while performing stirring.

After being cooled to room temperature, the mixture was filtered to recover the copolymer that had been precipitated. The filtered residue was washed with 300 ml of methanol twice, and was sufficiently dried under reduced pressure (below 100 mmHg) at 50° C. until a constant weight was reached. In this manner, 95.2 g of a white copolymer was obtained (yield 96%).

From the GPC analysis of the copolymer, the weight average molecular weight Mw was 120,000 and the molecular weight distribution Mw/Mn was 4.3. Further, $^{13}$C-NMR analysis showed that the ratio of the structural units in the copolymer, ATBS-K units/GMA units/KBE-503 units, was 59/41/0. The analysis did not detect any units resulting from the ring opening of an epoxy group. The results are described in Table 11.

TABLE 11

Polymer structures

| | | | | | Unit ratio (by mol) | | |
|---|---|---|---|---|---|---|---|
| No. | Copolymer | Appearance | Mw | Mw/Mn | ATBS-K | GMA | KBE-503 |
| Syn. Ex. 9 | CH120217 | White solid | 107,000 | 3.0 | 95 | 5 | — |

TABLE 11-continued

| | Polymer structures | | | | Unit ratio (by mol) | |
|---|---|---|---|---|---|---|
| No. | Copolymer | Appearance | Mw | Mw/Mn | ATBS-K | KBE-GMA 503 |
| Syn. Ex. 2 | CH140225 | White solid | 90,000 | 3.1 | 91 | 9 | — |
| Syn. Ex. 10 | CH140312 | White solid | 120,000 | 4.3 | 59 | 41 | — |

Reference Examples 9 and 10

A stack was obtained in which a coating film was formed on a primer layer disposed on a substrate (a glass plate) by repeating the procedures in the preparation of coating solution 1, the preparation of primer composition, the formation of primer layer and the formation of coating film in Example 1, except that the copolymer of Synthetic Example 1 was replaced by any of the copolymers described in Table 12 below. The properties of the coating film obtained (appearance, fouling by heating at 120° C., pencil hardness, antifogging properties and antifouling properties) were evaluated by the aforementioned methods. The results are described in Table 12. Table 12 also describes the results of Reference Example 1.

Reference Examples 11 and 12

A stack was obtained in which a coating film was formed on a primer layer disposed on a substrate (a glass plate) by repeating the procedures in the preparation of coating solution 2, the preparation of primer composition, the formation of primer layer and the formation of coating film in Example 3, except that the copolymer of Synthetic Example 1 was replaced by any of the copolymers described in Table 12 below. The properties of the coating film obtained (appearance, fouling by heating at 120° C., pencil hardness, antifogging properties and antifouling properties) were evaluated by the aforementioned methods. The results are described in Table 12. Table 12 also describes the results of Reference Example 3.

TABLE 12

ATBS units/GMA units ratio

| No. | Copolymer | Appearance | Water contact angle (°) Before heating | Water contact angle (°) 120° C. × 12 h | Haze (%) Before heating | Haze (%) 120° C. × 12 h | Pencil hardness | Antifogging properties | Antifouling properties | Coating solution |
|---|---|---|---|---|---|---|---|---|---|---|
| Ref. Ex. 9 | Syn. Ex. 9 95/5/0 | Transparent | 5 | 5 | 0.3 | 0.3 | 3H | ○ | ○ | Coating solution 1 with formulation 1 |
| Ref. Ex. 1 | Syn. Ex. 2 91/9/0 | Transparent | 7 | 9 | 0.2 | 0.3 | 3H | ○ | ○ | Same as above |
| Ref. Ex. 10 | Syn. Ex. 10 59/41/0 | Transparent | 10 | 11 | 0.3 | 0.3 | 3H | ○ | ○ | Same as above |
| Ref. Ex. 11 | Syn. Ex. 9 95/5/0 | Transparent | 5 | 8 | 0.3 | 0.4 | 6H | ○ | ○ | Coating solution 2 with formulation 2 |
| Ref. Ex. 3 | Syn. Ex. 2 91/9/0 | Transparent | 5 | 5 | 0.3 | 0.4 | 6H | ○ | ○ | Same as above |
| Ref. Ex. 12 | Syn. Ex. 10 59/41/0 | Transparent | 22 | 28 | 0.2 | 0.2 | 6H | Δ | ○ | Same as above |

Examples 10 to 16

A stack was obtained in which a coating film was formed on a primer layer disposed on a substrate (a glass plate) by repeating the procedures in the preparation of coating solution 1, the preparation of primer composition, the formation of primer layer and the formation of coating film in Example 1, except that the amount of DS-Na (surfactant) present in the coating solution 1 was changed as described in Table 13. The properties of the coating film obtained (appearance, fouling by heating at 120° C., pencil hardness, antifogging properties and antifouling properties) were evaluated. The results are described in Table 13.

TABLE 13

Test with variations in amount of surfactant in formulation 1

| No. | Amount of DS-Na (times/Ex. 1) | Substrate | Appearance | Water contact angle (°) Before heating | Water contact angle (°) 120° C. × 12 h | Haze (%) Before heating | Haze (%) 120° C. × 12 h | Pencil hardness | Antifogging properties | Antifouling properties | Copolymer |
|---|---|---|---|---|---|---|---|---|---|---|---|
| Ex. 10 | Not added | Glass | Transparent | 30 | 47 | 0.1 | 0.1 | 3H | x | Δ | Syn. Ex. 1 |
| Ex. 11 | 0.5 times | Glass | Transparent | 16 | 19 | 0.1 | 0.2 | 3H | Δ | ○ | Syn. Ex. 1 |

TABLE 13-continued

Test with variations in amount of surfactant in formulation 1

| No. | Amount of DS-Na (times/Ex. 1) | Substrate | Appearance | Water contact angle (°) Before heating | Water contact angle (°) 120° C. × 12 h | Haze (%) Before heating | Haze (%) 120° C. × 12 h | Pencil hardness | Antifogging properties | Antifouling properties | Copolymer |
|---|---|---|---|---|---|---|---|---|---|---|---|
| Ex. 1 | 1 time | Glass | Transparent | 9 | 11 | 0.2 | 0.2 | 3H | ○ | ○ | Syn. Ex. 1 |
| Ex. 12 | 2 times | Glass | Transparent | 9 | 10 | 0.2 | 0.3 | 3H | ○ | ○ | Syn. Ex. 1 |
| Ex. 13 | 3 times | Glass | Transparent | 7 | 8 | 0.2 | 0.8 | 2H | ○ | ○ | Syn. Ex. 1 |
| Ex. 14 | 5 times | Glass | Transparent | 4 | 7 | 0.3 | 2.2 | 2H | ○ | ○ | Syn. Ex. 1 |
| Ex. 15 | 7 times | Glass | Transparent | <4 | 9 | 0.4 | 3.5 | 2H | ○ | ○ | Syn. Ex. 1 |
| Ex. 16 | 10 times | Glass | Transparent | 12 | 13 | 0.9 | 5.1 | 2H | ○ | ○ | Syn. Ex. 1 |

Examples 17 to 42

A stack was obtained in which a coating film was formed on a primer layer disposed on a substrate (a glass plate) by repeating the procedures in the preparation of coating solution 1, the preparation of primer composition, the formation of primer layer and the formation of coating film in Example 1, except that the amount of the copolymer of Synthetic Example 1, the amount of the 30 wt % silica sol in methanol and the amount of the 60 wt % aqueous methylated melamine resin solution present in the coating solution 1 were changed as described in Table 14 or Table 15. The properties of the coating film obtained (appearance, fouling by heating at 120° C., pencil hardness and antifouling properties) were evaluated. The results are described in Table 14 and Table 15.

TABLE 14

Test with variations in copolymer/silica particles/melamine resin ratio

| No. | Copolymer (g) | 30% Silica sol (g) | 60% Melamine resin (g) | Polymer/silica/ melamine resin weight ratio | Water contact angle (°) Before heating | Water contact angle (°) 120° C. × 12 h | Haze (%) Before heating | Haze (%) 120° C. × 12 h | Pencil hardness | Antifouling properties |
|---|---|---|---|---|---|---|---|---|---|---|
| Ex. 17 | 0.52 | 0.21 | 0.11 | 80/10/10 | 10 | 10 | 0.1 | 0.2 | 2H | ○ |
| Ex. 18 | 0.38 | 0.00 | 0.43 | 60/0/40 | 57 | 41 | 0.1 | 0.3 | — | ○ |
| Ex. 19 | 0.38 | 0.43 | 0.21 | 60/20/20 | 9 | 7 | 0.2 | 0.4 | 2H | ○ |
| Ex. 20 | 0.38 | 0.64 | 0.11 | 60/30/10 | 8 | 10 | 0.1 | 0.1 | 2H | ○ |
| Ex. 21 | 0.32 | 0.00 | 0.53 | 50/0/50 | 55 | 52 | 0.2 | 0.3 | — | x |
| Ex. 22 | 0.32 | 0.43 | 0.32 | 50/20/30 | 32 | 35 | 0.1 | 0.2 | — | Δ |
| Ex. 23 | 0.32 | 0.64 | 0.21 | 50/30/20 | 8 | 11 | 0.1 | 0.2 | 3H | ○ |
| Ex. 24 | 0.32 | 0.85 | 0.11 | 50/40/10 | 8 | 9 | 0.1 | 0.2 | H | ○ |
| Ex. 25 | 0.26 | 0.00 | 0.64 | 40/0/60 | 44 | 45 | 3.4 | 3.8 | — | x |
| Ex. 26 | 0.26 | 0.43 | 0.43 | 40/20/40 | 47 | 55 | 0.2 | 0.1 | — | x |
| Ex. 27 | 0.26 | 0.64 | 0.32 | 40/30/30 | 42 | 42 | 0.1 | 0.2 | — | ○ |
| Ex. 28 | 0.26 | 0.85 | 0.21 | 40/40/20 | 7 | 8 | 0.1 | 0.2 | 3H | ○ |
| Ex. 29 | 0.26 | 1.06 | 0.11 | 40/50/10 | 8 | 11 | 0.2 | 0.2 | — | ○ |
| Ex. 30 | 0.19 | 0.00 | 0.75 | 30/0/70 | 38 | 34 | 3.0 | 2.8 | — | ○ |
| Ex. 31 | 0.19 | 0.43 | 0.53 | 30/20/50 | 27 | 30 | 0.6 | 0.4 | 6H | ○ |
| Ex. 32 | 0.19 | 0.85 | 0.32 | 30/40/30 | 9 | 10 | 0.1 | 0.1 | 6H | ○ |

TABLE 15

| No. | Copolymer (g) | 30% Silica sol (g) | 60% Melamine resin (g) | Polymer/silica/ melamine resin weight ratio | Water contact angle (°) Before heating | Water contact angle (°) 120° C. × 12 h | Haze (%) Before heating | Haze (%) 120° C. × 12 h | Pencil hardness | Antifouling properties |
|---|---|---|---|---|---|---|---|---|---|---|
| Ex. 33 | 0.19 | 1.06 | 0.21 | 30/50/20 | 10 | 10 | 0.2 | 0.2 | 7H | ○ |
| Ex. 34 | 0.19 | 1.28 | 0.11 | 30/60/10 | 18 | 18 | 0.2 | 0.6 | — | ○ |
| Ex. 35 | 0.13 | 0.00 | 0.85 | 20/0/80 | 53 | 51 | 4.1 | 6.3 | — | Δ |
| Ex. 36 | 0.13 | 0.43 | 0.64 | 20/20/60 | 40 | 37 | 0.3 | 2.1 | — | Δ |
| Ex. 37 | 0.13 | 1.06 | 0.32 | 20/50/30 | 18 | 20 | 0.1 | 0.1 | 6H | ○ |
| Ex. 38 | 0.13 | 1.28 | 0.21 | 20/60/20 | 13 | 15 | 0.5 | 1.0 | 8H | ○ |
| Ex. 39 | 0.13 | 1.49 | 0.11 | 20/70/10 | 11 | 11 | 0.2 | 1.9 | 7H | ○ |
| Ex. 40 | 0.06 | 0.43 | 0.75 | 10/20/70 | 50 | 55 | 0.2 | 0.3 | — | Δ |
| Ex. 41 | 0.06 | 1.07 | 0.43 | 10/50/40 | 42 | 40 | 0.2 | 0.1 | — | Δ |
| Ex. 42 | 0.06 | 1.49 | 0.21 | 10/70/20 | 21 | 17 | 0.2 | 0.2 | — | ○ |

[Synthetic Example 11] (Method for Producing Methylated Aniline Resin)

A reaction flask was loaded with 94.0 g (1.0 mol) of aniline and 160 g of methanol. In a water bath, 109.6 g (1.0 mol) of 35 wt % hydrochloric acid was added dropwise while performing stirring of the contents. Next, 178.4 g (2.2 mol) of a 37 wt % aqueous formaldehyde solution was added, and the reaction was performed under reflux for 5 hours (internal temperature 67° C.)

After the completion of the reaction, the resultant reaction liquid was cooled to room temperature and was neutralized in a water bath by the dropwise addition of 189.0 g (1.05 mol) of 30 wt % sodium methoxide (as a methanol solution) at an internal temperature of not more than 30° C.

The liquid was filtered to recover the copolymer (the methylated aniline resin) that had been precipitated. The filtered residue was washed with 1000 ml of methanol and was sufficiently dried under reduced pressure (below 100 mmHg) at 25 to 30° C. until a constant weight was reached (for 2 days). In this manner, 110 g of an orange copolymer was obtained.

From the GPC analysis of the copolymer (the methylated aniline resin), the weight average molecular weight Mw was 800.

Examples 43 and 44

A stack was obtained in which a coating film was formed on a primer layer disposed on a substrate (a glass plate) by repeating the procedures in the preparation of coating solution 1, the preparation of primer composition, the formation of primer layer and the formation of coating film in Example 1, except that the methylated melamine resin present in the coating solution 1 was changed to the amino resin described in Table 16 (Example 43: methylated urea resin, Example 44: methylated aniline resin). The properties of the coating film obtained (appearance, fouling by heating at 120° C., pencil hardness, antifogging properties, antifouling properties and adhesion) were evaluated. The results are described in Table 16. Table 16 also describes the results of Example 1.

TABLE 16

Results of application test with formulation 1

| No. | Amino resin | Substrate | Appearance | Water contact angle Before heating | Water contact angle 120° C. × 12 h | Haze Before heating | Haze 120° C. × 12 h | Pencil hardness | Antifogging properties | Antifouling properties | Adhesion |
|---|---|---|---|---|---|---|---|---|---|---|---|
| Ex. 1 | Methylated melamine resin | Glass | Transparent | 9 | 11 | 0.2 | 0.2 | 3H | ○ | ○ | 100/100 |
| Ex. 43 | Methylated urea resin | Glass | Transparent | 6 | 7 | 0.3 | 0.4 | 3H | ○ | ○ | 100/100 |
| Ex. 44 | Methylated aniline resin | Glass | Transparent | 26 | 33 | 0.2 | 0.4 | 3H | ○ | ○ | 100/100 |

[Chem. 35]

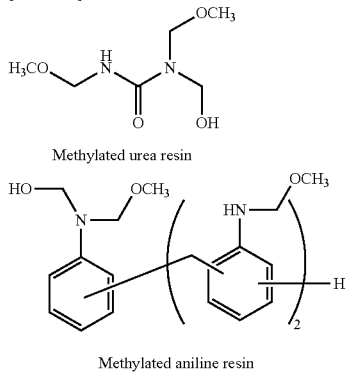

Methylated urea resin

Methylated aniline resin

[Synthetic Example 12] <Production of Copolymer SPA CH130219>

A reaction flask was loaded with 52.43 g (0.2425 mol) of 3-sulfopropyl acrylate•sodium salt (hereinafter, written as SPA-Na), 2.43 g (0.0121 mol) of 4-glycidyloxy-butyl acrylate (hereinafter, written as GOBA), 2.84 g (0.0121 mol) of 3-acryloyloxy-propyltrimethoxysilane (hereinafter, written as KBM-5103) and 488.9 g of methanol that had been degassed under reduced pressure. A mixture liquid was thus prepared.

While performing stirring and while heating the mixture liquid under reflux (internal temperature 65° C.), a mixture liquid of 0.12 g of perbutyl-O and 1.2 g of methanol was added. The polymerization was performed by heating the mixture under reflux for 4 hours while performing stirring.

Thereafter, the resultant polymerization solution was concentrated in a rotary evaporator under reduced pressure. The residue was combined with 400 g of isopropanol and 400 g of cyclohexane, and the mixture was mixed together vigorously.

The mixture was filtered to recover the polymer that had been precipitated. The filtered residue was washed with ethanol and was dried sufficiently under reduced pressure (below 100 mmHg) at 50° C. until a constant weight was reached. In this manner, 52.5 g of a white copolymer was obtained (yield 91%).

From the GPC analysis of the copolymer, the weight average molecular weight Mw was 96,000 and the molecular weight distribution Mw/Mn was 3.9. Further, $^{13}$C-NMR analysis showed that the ratio of the structural units in the copolymer, SPA-Na units/GOBA units/KBM-5103 units, was 91/5/4. The analysis did not detect any units resulting from the ring opening of an epoxy group.

Example 45

A stack was obtained in which a coating film was formed on a primer layer disposed on a substrate (a glass plate) by repeating the procedures in the preparation of coating solution 1, the preparation of primer composition, the formation of primer layer and the formation of coating film in Example 1, except that the copolymer of Synthetic Example 1 was replaced by the copolymer of Synthetic Example 12. The properties of the coating film obtained (appearance, fouling by heating at 120° C., pencil hardness, antifogging properties, antifouling properties and adhesion) were evaluated. The results are described in Table 17.

The invention claimed is:

1. A cured product obtained from a composition comprising:
   a copolymer (i) including structural units represented by the general formulae (1), (2) and (3) below, and
   an amino resin (ii)

[Chem. 1]

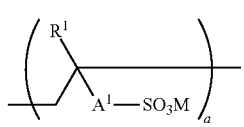

(1)

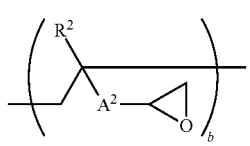

(2)

TABLE 17

Results of application test with formulation 1 involving copolymer SPA

| | | | | Water contact angle | | Haze | | | | | |
|---|---|---|---|---|---|---|---|---|---|---|---|
| No. | Copolymer | Substrate | Appearance | Before heating | 120° C. × 12 h | Before heating | 120° C. × 12 h | Pencil hardness | Antifogging properties | Antifouling properties | Adhesion |
| Ex. 45 | Syn. Ex. 12 (91/5/4) | Glass | Transparent | 9 | 13 | 0.2 | 0.3 | 2H | ◯ | ◯ | 100/100 |

[Chem. 36]

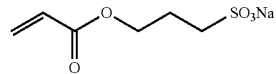

SPA-Na

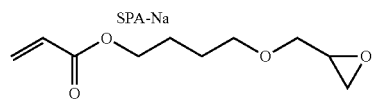

GOBA

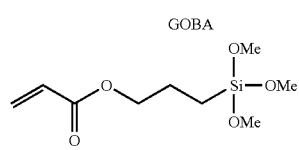

KBM-5103

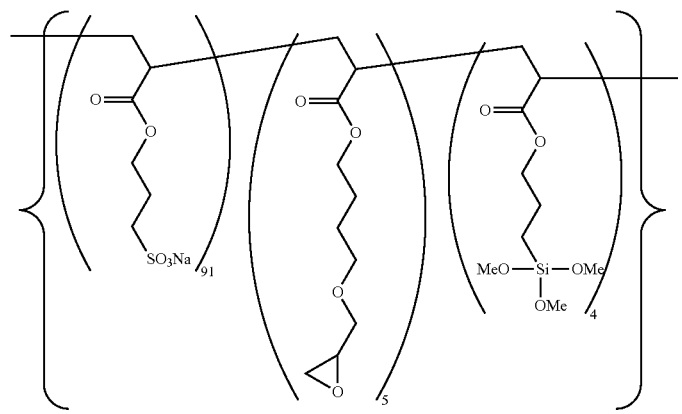

Polymer (copolymer) of Synthetic Example 12 Mw = 96,000

-continued (3)

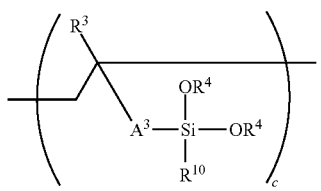

(in the formulae (1), (2) and (3), the letters a, b and c indicate the proportions of the respective structural units relative to the total number of the structural units denoted by a, b and c taken as 100 (a+b+c=100), $A^1$ denotes a single bond, a $C_{1-10}$ divalent hydrocarbon group, a group represented by the formula (1-1) below, or a group represented by the formula (1-2) below, $A^2$ denotes a single bond, a $C_{1-10}$ divalent hydrocarbon group, a group represented by the formula (2-1) below, or a group represented by the formula (2-2) below, $A^3$ denotes a single bond, a $C_{1-10}$ divalent hydrocarbon group, a group represented by the formula (3-1) below, or a group represented by the formula (3-2) below, $R^1$, $R^2$ and $R^3$ are each independently a hydrogen atom or a methyl group, $R^4$ at each occurrence is a hydrogen atom, a methyl group, an ethyl group, a propyl group or a butyl group, and $R^4$s may be the same as or different from each other, $R^{10}$ denotes a hydrogen atom, a methyl group, an ethyl group, a propyl group, a butyl group, a methoxy group, an ethoxy group, a propoxy group or a butoxy group, M denotes a hydrogen atom, an alkali metal ion, an alkaline earth metal ion having 1/2 atomic valence, an ammonium ion or an amine ion, and in the formulae (1-1), (1-2), (2-1), (2-2), (3-1) and (3-2), n and n2 are each independently an integer of 1 to 10, n1 is an integer of 0 to 10, m is an integer of 1 to 6, m1 is an integer of 0 to 6, l is an integer of 0 to 4, $R^5$ and $R^6$ are each independently a hydrogen atom or a methyl group, * means that the indicated end is bonded to $SO_3M$,  means that the indicated end is bonded to the epoxy group, and * means that the indicated end is bonded to the Si atom)

[Chem. 2]

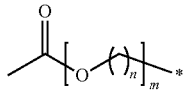
(1-1)

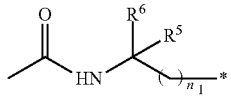
(1-2)

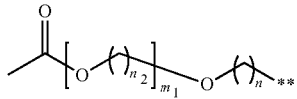
(2-1)

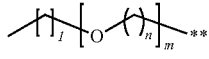
(2-2)

-continued

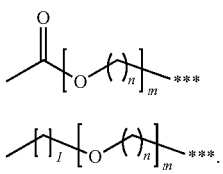
(3-1)

(3-2)

2. The cured product according to claim 1, which is obtained from the composition wherein the copolymer (i) is a copolymer (i3-1) including structural units represented by the general formulae (4), (5) and (6) below:

[Chem. 3]

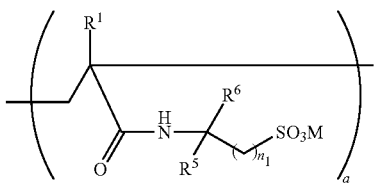
(4)

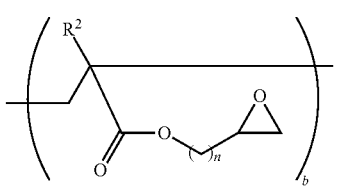
(5)

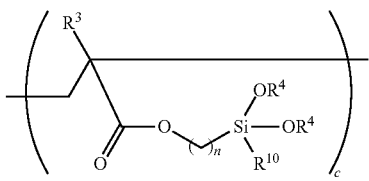
(6)

(in the formulae (4), (5) and (6), the letters a, b and c indicate the proportions of the respective structural units relative to the total number of the structural units denoted by a, b and c taken as 100 (a+b+c=100), n is an integer of 1 to 10, n1 is an integer of 0 to 10, $R^1$, $R^2$, $R^3$, $R^5$ and $R^6$ are each independently a hydrogen atom or a methyl group, $R^4$ at each occurrence is a hydrogen atom, a methyl group, an ethyl group, a propyl group or a butyl group, and $R^4$s may be the same as or different from each other, $R^{10}$ denotes a hydrogen atom, a methyl group, an ethyl group, a propyl group, a butyl group, a methoxy group, an ethoxy group, a propoxy group or a butoxy group, and M denotes a hydrogen atom, an alkali metal ion, an alkaline earth metal ion having 1/2 atomic valence, an ammonium ion or an amine ion).

3. The cured product according to claim 1, which is obtained from the composition wherein the weight average molecular weight of the copolymer (i) measured by gel permeation chromatography (GPC) relative to polymethyl methacrylate standards is 500 to 3,000,000.

4. The cured product according to claim 1 which is obtained from the composition wherein the amino resin (ii) is an amino resin (ii1) represented by the general formula (7) below:

[Chem. 4]

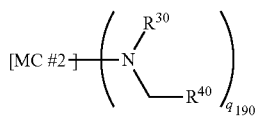
(7)

(in the formula (7), $R^{30}$ is a hydrogen atom, a $C_{1-10}$ alkyl group, a hydroxymethyl group or a $C_{1-10}$ alkoxymethyl group, $R^{40}$ is a hydroxyl group, a hydrogen atom, a $C_{1-10}$ alkyl group or a $C_{1-10}$ alkoxy group, q190 is an integer of 1 to 90, MC denotes a mother core represented by any of the general formulae (8) to (10) below, #2 denotes a hand bonded to #1 in any of the general formulae (8) to (10), and there are the same number of #2s as the number of #1s, in the formula (8), $q_{o30}$ at each occurrence is an integer of 0 to 30, $q_{o30}$'s may be the same as or different from one another, and $R^{30}$'s and $R^{40}$'s are the same as defined in the formula (7), in the formula (9), $q_{o50}$ is an integer of 0 to 50, X at each occurrence denotes an oxygen atom or a sulfur atom, and $R^{30}$'s and $R^{40}$ are the same as defined in the formula (7), and in the formula (10), $q_{o50}$ is an integer of 0 to 50)

[Chem. 5]

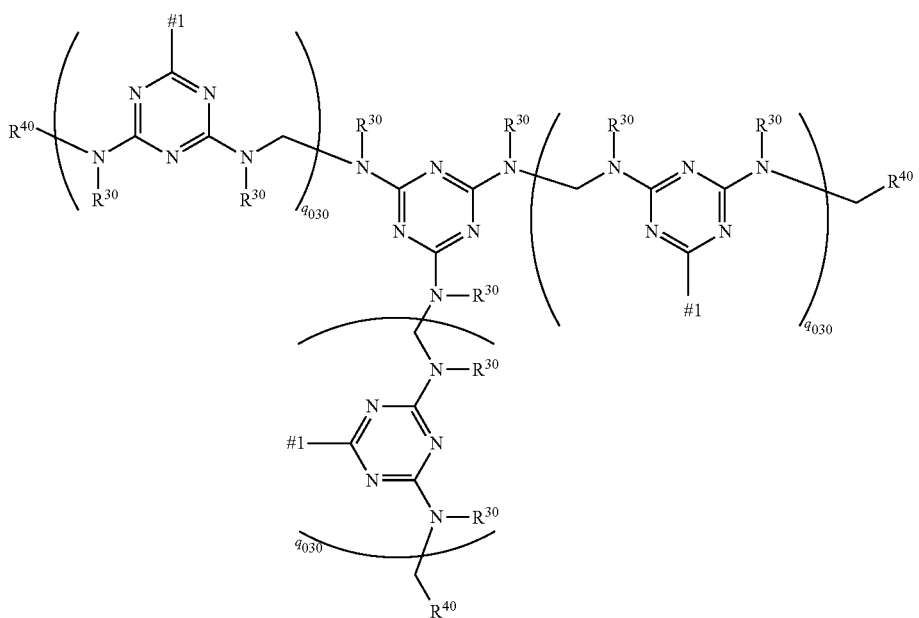
(8)

[Chem. 6]

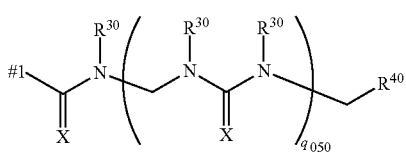
(9)

[Chem. 7]

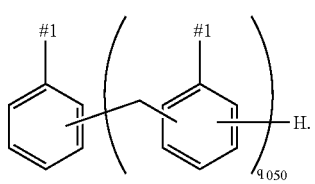
(10)

5. The cured product according to claim 1, which is obtained from the composition wherein the weight ratio (i)/(ii) of the copolymer (i) to the amino resin (ii) is in the range of 99/1 to 1/99.

6. The cured product according to claim 1, which is obtained from the composition further comprising inorganic particles (iii).

7. The cured product according to claim 6, which is obtained from the composition including 5 to 98 parts by weight of the copolymer (i), 1 to 70 parts by weight of the amino resin (ii) and 1 to 90 parts by weight of the inorganic particles (iii) (wherein the total weight of the copolymer (i), the amino resin (ii) and the inorganic particles (iii) is 100 parts by weight).

8. A film (Z1) comprising the cured product described in claim 1, the thickness of the film being 0.01 to 300 μm.

9. A stack having at least one layer comprising the film (Z1) described in claim 8.

* * * * *